United States Patent
Wu et al.

(10) Patent No.: US 12,034,616 B1
(45) Date of Patent: *Jul. 9, 2024

(54) SECURITY ANALYSIS AGENTS

(71) Applicant: Dropzone.ai, Inc., Seattle, WA (US)

(72) Inventors: Xue Jun Wu, Seattle, WA (US); Sen Xiang, Redmond, WA (US); Eric Joseph Hammerle, Kirkland, WA (US)

(73) Assignee: Dropzone.ai, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,712

(22) Filed: Feb. 26, 2024

Related U.S. Application Data

(63) Continuation of application No. 18/230,123, filed on Aug. 3, 2023, now Pat. No. 11,916,767.

(51) Int. Cl.
*H04L 43/04* (2022.01)
*H04L 41/16* (2022.01)

(52) U.S. Cl.
CPC .............. *H04L 43/04* (2013.01); *H04L 41/16* (2013.01)

(58) Field of Classification Search
CPC ................... H04L 43/04; H04L 41/16
See application file for complete search history.

(56) References Cited

U.S. PATENT DOCUMENTS

| | | |
|---|---|---|
| 11,916,767 B1 | 2/2024 | Wu et al. |
| 2018/0240043 A1 | 8/2018 | Majumdar et al. |
| 2023/0208971 A1 | 6/2023 | Te Booij et al. |
| 2023/0244869 A1 | 8/2023 | Neumann |
| 2023/0359789 A1 | 11/2023 | Andre et al. |

OTHER PUBLICATIONS

Office Communication for U.S. Appl. No. 18/230,123 mailed Sep. 25, 2023, 9 Pages.
Office Communication for U.S. Appl. No. 18/230,123 mailed Dec. 12, 2023, 22 Pages.

*Primary Examiner* — Adnan M Mirza
(74) *Attorney, Agent, or Firm* — John W. Branch; Branch Partners PLLC

(57) ABSTRACT

Embodiments are directed to security analysis agents. Events associated with a computing environment may be provided. Prompt fragments may be determined based on the events. A prompt may be generated for a large language model (LLM) based on a prompt template and the prompt fragments such that the prompt fragments may be included in the prompt and provided to the LLM. Actions for evaluating the events may be determined based on the LLM response. These actions may be executed to evaluate the events. Portions of the response that correspond to the prompt fragments may be determined. A performance score may be determined for each prompt fragment based on its corresponding portion of the response such that the prompt may be modified to exclude a portion of the prompt fragments that have a performance score less than a threshold value.

18 Claims, 13 Drawing Sheets

SECURITY ANALYSIS AGENTS

CROSS-REFERENCE TO RELATED APPLICATIONS

This Utility Patent Application is a Continuation of U.S. patent application Ser. No. 18/230,123 filed on Aug. 3, 2023, now U.S. Pat. No. 11,916,767 issued on Feb. 27, 2024, the benefit of the filing date of which is hereby claimed under 35 U.S.C. § 120, and the contents of which is further incorporated in entirety by reference.

TECHNICAL FIELD

These innovations relate generally to computer associated security, and more particularly, but not exclusively, to security analysis agents.

BACKGROUND

As organizations become increasingly dependent on heterogenous computer environments that may include complex networks, remote services, distributed services, or the like, managing and monitoring infrastructure access in such computing environments can become both critically important and more difficult. Difficulties in managing computing environments may not be new, however, interconnections among remote offices, data centers, remote employees, remote customers, and so on, have resulted in organizations relying more broadly on heterogeneous distributed services, or the like. To help manage their information technology infrastructure, organizations have developed various strategies to protect their technology and infrastructure from direct threats. One practice is to install monitoring technology that can observe or detect various activities, behaviors, or operational quality in their computing environments. Typically, monitoring technologies generate events or alerts that may indicate the occurrence of undesirable circumstances in the monitored environments. However, as these computing environments have grown in size or complexity, the number of events or alerts issued in such environment has also grown. Also, along with the increase in events or alerts there is often an increase in the number of events or alerts that may be considered false positives. These may be events or alerts that may have been triggered by circumstances that ultimately may be of no concern. Unfortunately, such events may require manual investigation to determine that they are actually false positives. Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
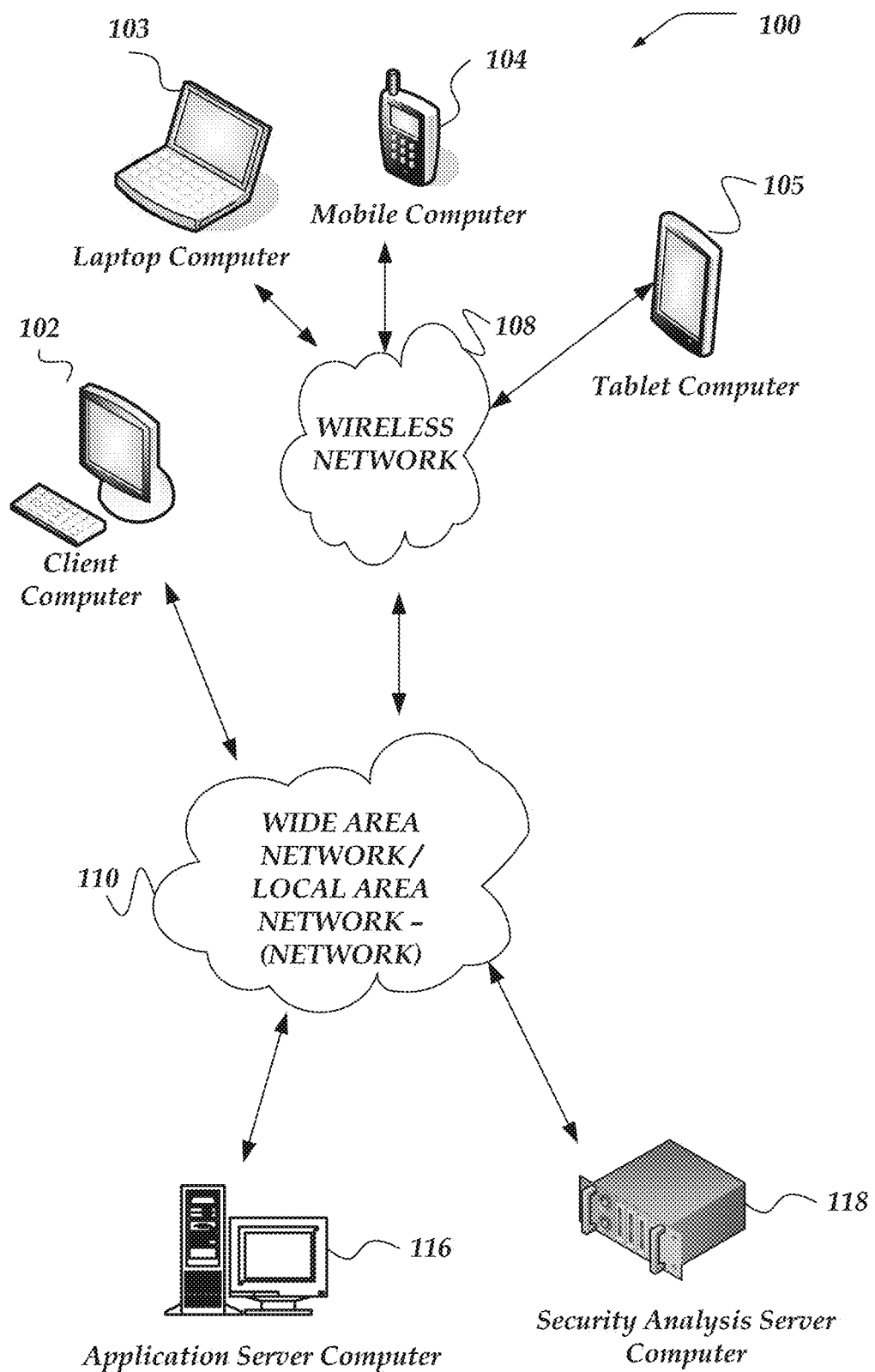
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or "prompt dataset" refer to one or more data structures that contain or represent prompt information that may be provided to LLMs.

As used herein, the term "event," or "event information" as used herein refer one or more data structures or messages that may report outcomes, conditions, or occurrences that may be detected or observed in a networked computing environment. Event information may include additional context information associated with an event, such as event source, event type, or the like. Organizations may deploy various systems may be configured to monitor various types of events depending on needs of an industry or technology area. For example, information technology services may generate events in response to one or more conditions, such as, computers going offline, memory over-utilization, CPU over-utilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. Events may be provided using one or more messages, emails, telephone calls, library function calls, application programming interface (API) calls, including, any signals provided to indicate that an event has occurred. One or more third party and/or external systems may be configured to generate event messages.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to security analysis agents. In one or more of the various embodiments, one or more events associated with one or more resources or one or more activities in the network may be provided.

In one or more of the various embodiments, one or more prompt fragments may be determined based on the one or more events.

In one or more of the various embodiments, a prompt may be generated for a large language model (LLM) based on a prompt template and the one or more prompt fragments such that the one or more prompt fragments may be included in the prompt, and such that information associated with the one or more events is included in the prompt.

In one or more of the various embodiments, in response to providing the prompt to train the LLM, further actions may be performed, including: determining one or more actions for evaluating the one or more events based on machine-readable information included in a response provided by the trained LLM; executing the one or more actions to evaluate the one or more events such that a portion of the one or more events may be classified based on the evaluation; determining one or more portions of the response based on the one or more prompt fragments such that each determined portion of the response corresponds to at least one of the one or more prompt fragments; determining a performance score for each prompt fragment based on its corresponding determined portion of the response such that the prompt may be modified to exclude a portion of the prompt fragments that have a value of the performance score being less than a threshold value.

In one or more of the various embodiments, classifying the one or more events may include, classifying a portion of the one or more events as one or more false positive events based on the evaluation.

In one or more of the various embodiments, an initial prompt may be generated for the LLM based on an initial prompt template and the one or more events. In some embodiments, in response to providing the initial prompt to the LLM, determining the prompt template and the one or more prompt fragments based on other information included in another response provided by the LLM.

In one or more of the various embodiments, one or more metrics may be determined for each prompt fragment based on its corresponding determined portion of the response. In some embodiments, the performance score for each prompt fragment may be determined based on the one or more metrics such that the one or more metrics include one or more of latency, correctness, resource consumption, cost, event type applicability, redundancy, or the like.

In one or more of the various embodiments, determining the performance score for each prompt fragment may include: generating one or more synthetic events based on one or more scenarios such that an expected classification of each synthetic event is known in advance; modifying the prompt to include the one or more synthetic events such that the modified prompt may be provided to the LLM to generate another response; determining one or more other portions of the other response based on the one or more prompt fragments such that each determined other portion of the other response may correspond to a prompt fragment; comparing each determined other portion of the response to the expected classification of each synthetic event; updating the performance score for each prompt fragment based on the comparison; or the like.

In one or more of the various embodiments, executing the one or more actions for evaluating the one or more events may include: determining one or more evaluation tools based on the information included in the response from the LLM; determining one or more parameters for the one or more evaluation tools based on the information included in the response from the LLM such that the one or more parameters include one or more characteristics of the one or more events; executing the one or more evaluation tools using the one or more parameters; or the like.

In one or more of the various embodiments, determining the one or more actions for evaluating the one or more events may include: determining one or more agents based on the response such that each agent may be associated with one or more LLMs and each agent includes an agent prompt that includes one or more agent prompt fragments; employing the one or more agents to execute the one or more actions such that the one or more agents generate one or more action responses based on the one or more of the one or more events or the response; or the like.

In one or more of the various embodiments, determining the one or more prompt fragments may include: providing a data store that includes a plurality of prompt fragments; selecting the one or more prompt fragments from data store based on the performance score of each prompt fragment such that the performance score may be based on one or more previous event evaluations; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, security analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, security analysis server computer 118, or other computers.

Client computers 102-105 may further be configured to include a client application that enables an end-user to log into an end-user account that may be managed by another computer, such as application server computer 116, security analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to security analysis server computer 118. Also, client computers may be arranged to enable users to display reports, interactive user-interfaces, results provided by security analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, security analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and security analysis server computer 118 are described in more detail below in conjunction with FIG. 3. Although FIG. 1 illustrates application server computer 116, or security analysis server computer 118 each as a single computer, the innovations or embodiments are not so limited. For example, one or more functions of application server computer 116, or security analysis server computer 118, or the like, may be distributed across one or more distinct network computers. Moreover, in one or more embodiments, security analysis server computer 118 may be implemented using a plurality of network computers. Further, in one or more of the various embodiments, application server computer 116, or security analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
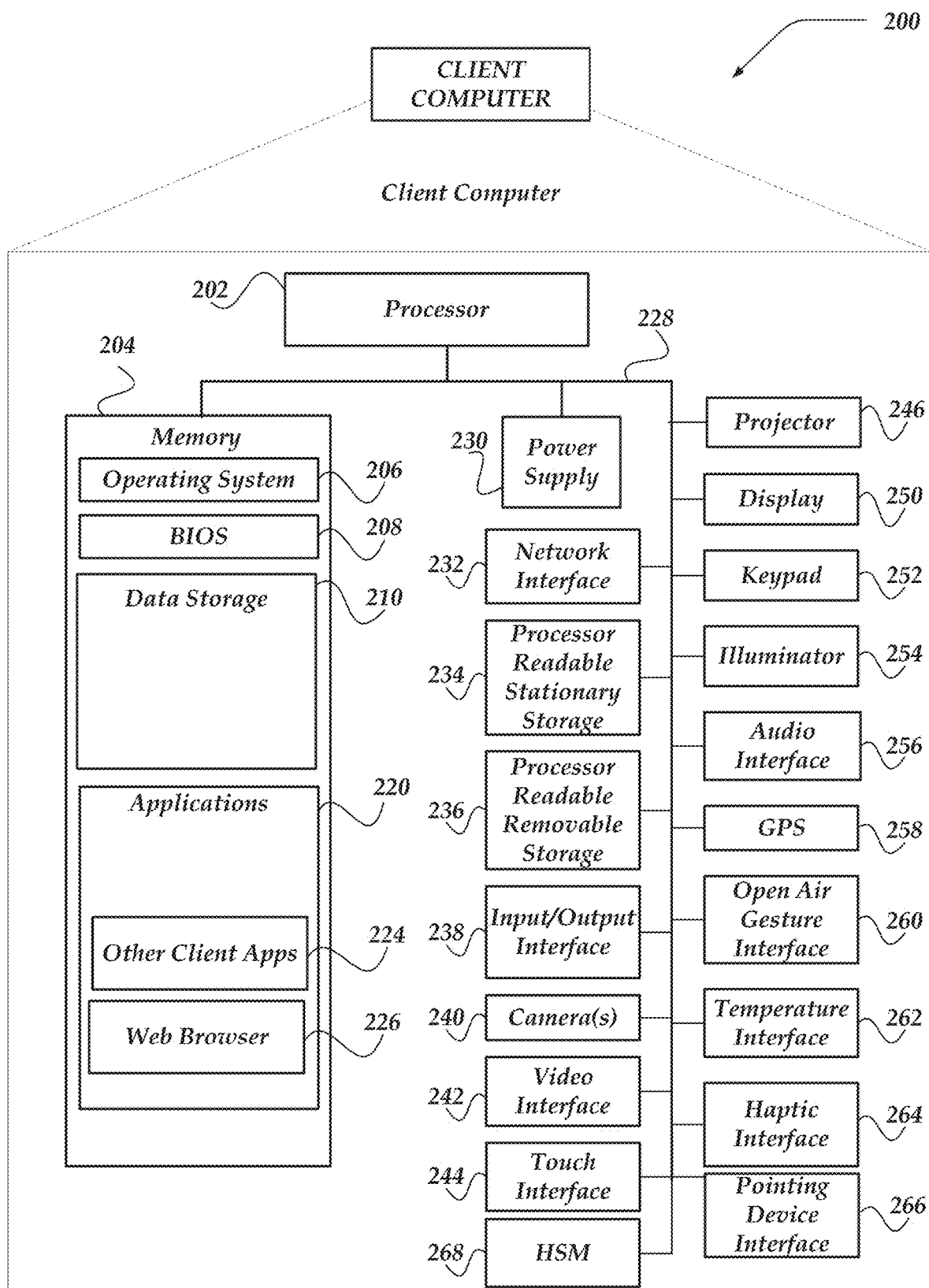
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zig-bee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
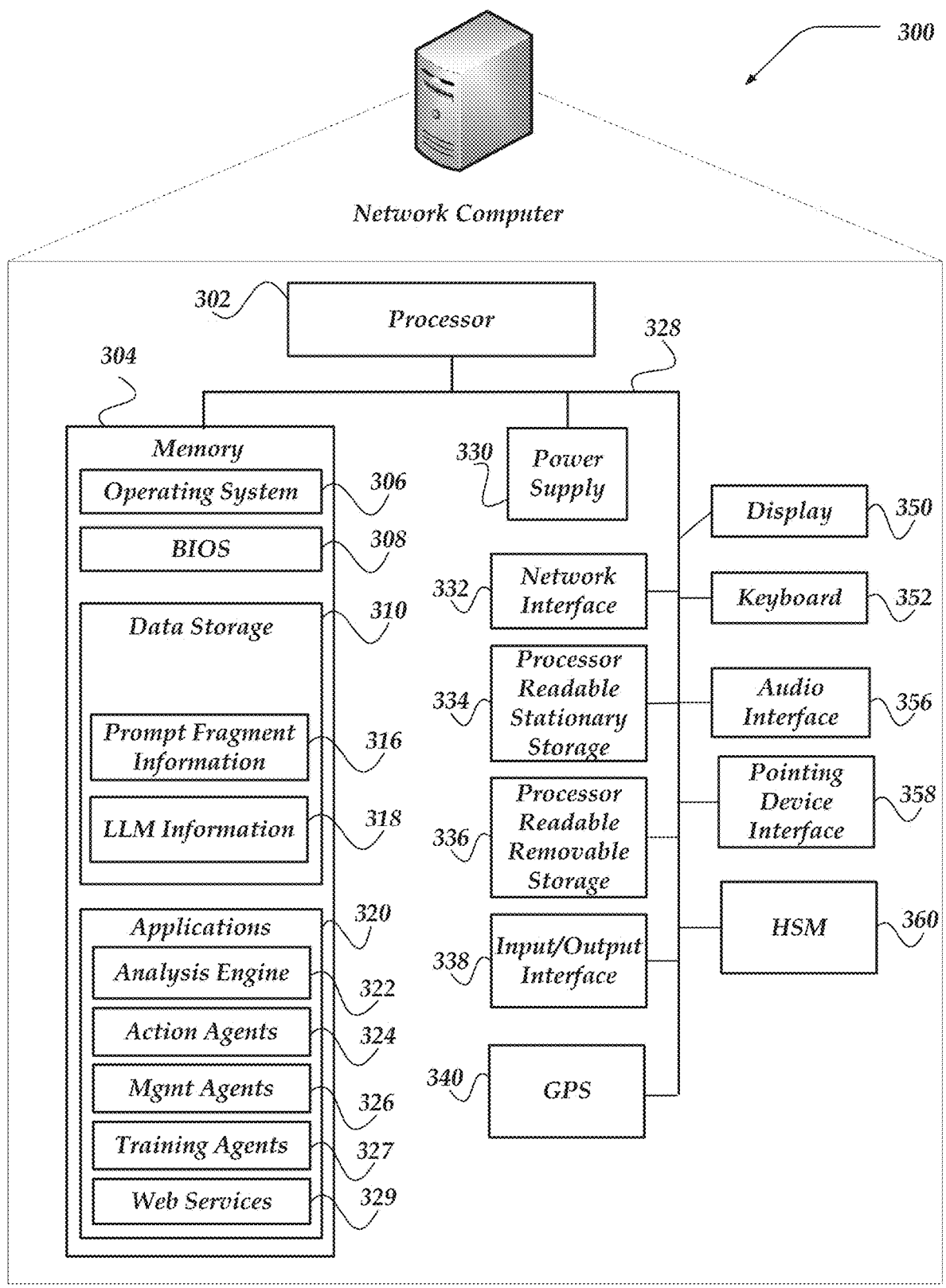
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, security analysis server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, analysis engine 322, action agents 324, management agents 326, training agents 327, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, prompt fragment information 316, large language model information 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include analysis engine 322, action agents 324, management agents 326, training agents 327, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, action agent(s) 324, management agents 326, training agents 327, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, action agent(s) 324, management agents 326, training agents 327, web services 329, or the like, may be provisioned and de-commissioned automatically.

Also, in one or more of the various embodiments, analysis engine 322, action agent(s) 324, management agents 326, training agents 327, web services 329, or the like, may be located in virtual servers running in a cloud-based computing environment rather than being tied to one or more specific physical network computers. Likewise, in some embodiments, one or more of analysis engine 322, action agent(s) 324, management agents 326, training agents 327, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
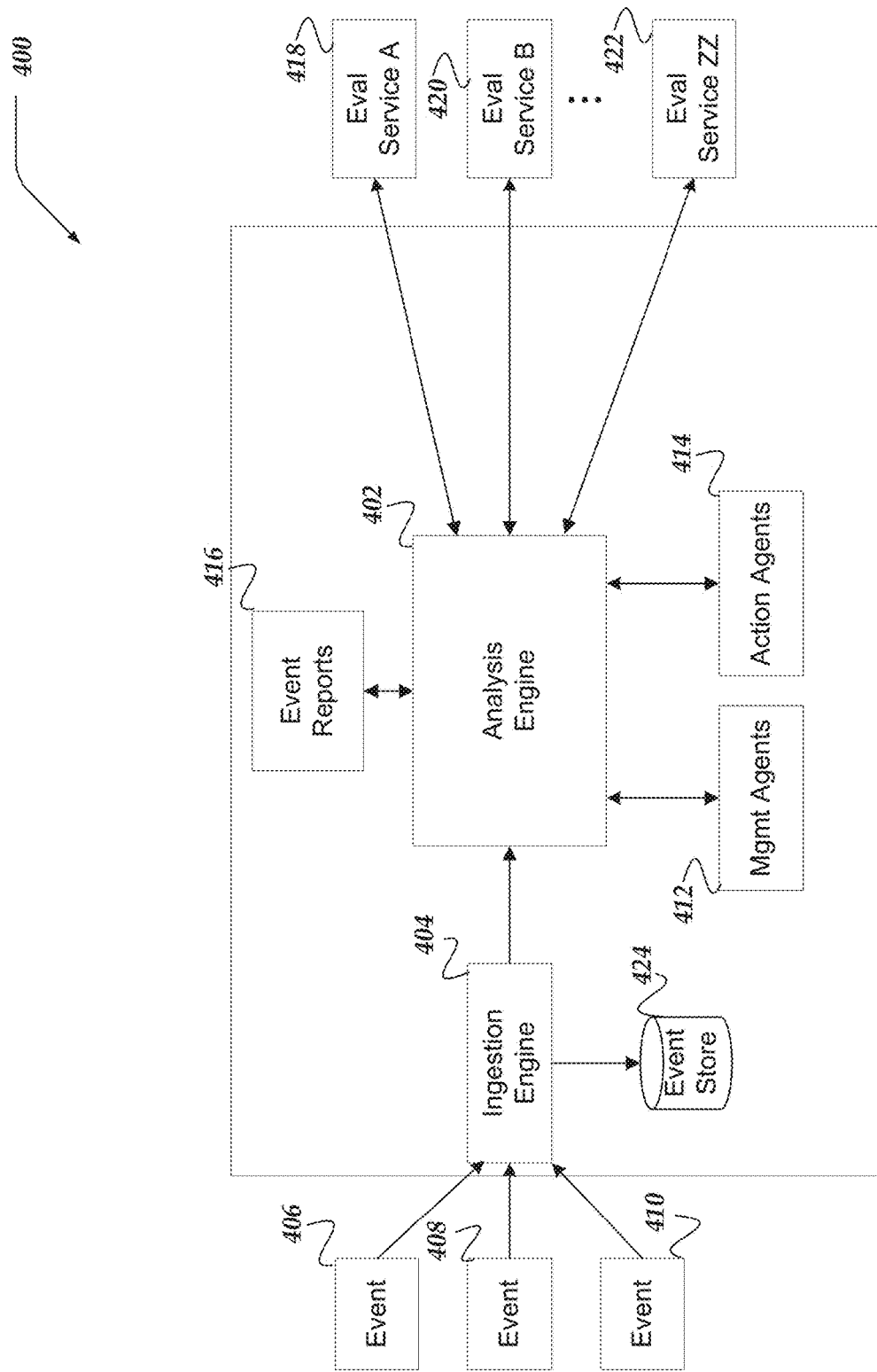
FIG. 4 illustrates a logical architecture of a system for security analysis agents in accordance with one or more of the various embodiments.

FIG. 4 illustrates a logical architecture of system 400 for security analysis agents in accordance with one or more of the various embodiments.

In one or more of the various embodiments, analysis engines, such as, analysis engine 402 may be provided one or more events, such as, event 406, event 408, event 410, or the like, via an ingestion engine, such as, ingestion engine 404. Accordingly, in some embodiments, as event information may be ingested, analysis engines may be arranged to employ one or more agents, such as, management agent 412, action agents 414, or the like, to evaluate the events to determine if the events may be events that may be worthy of taking notice. Thus, in some embodiments, analysis engines may be arranged to generate one or more reports, such as, event reports 416 that include information about the one or more events based on the evaluation.

In one or more of the various embodiments, agents, including management agents 412 or action agents 414 may be arranged to communicate with one or more internal or external services that may contribute to the evaluation of events. In this example, for some embodiments, service 418, service 420, or service 422 may be considered to represent one or more internal or external (e.g., third-party SaaS) evaluation services.

In one or more of the various embodiments, organizations may conventionally deploy computing environments that may include various services, applications, devices, systems, or the like, that may monitor various features or metrics associated with their computing infrastructure. In some cases, multiple applications or services may be configured to generate event information, such as log entries, event notifications, alarms, alerts, or the like, that may be relevant to the particular applications or services. Also, in some embodiments, organizations may employ one or more dedicated monitoring tools that may be configured to generate event information associated with various conditions or activity that may occur in the monitored environments. Further, in some embodiments, organizations may deploy one or more network devices that monitor network activity, enforce access policies, balance workloads, or the like. Also, in some embodiments, many organizations may include one or more customized monitoring or alerting systems that may be directed to generating event information associated with their particular operating environments. In general, in some embodiments, organizations may configure their networking environments or computing environments to automatically generate an arbitrary number of events or event information depending on their local requirements or local circumstances. Note, herein computing environments may be alternatively described using terms such as networked environments, monitored networks, or the like. For brevity and clarity these terms may be considered to be computing environments and are not restricted to networks, networked environments, or the like. Also, in some cases, the innovations disclosed herein may be practiced using a single computer or computing device.

In some cases, organizations may be faced with interpreting or processing many events or different event types generated by various sources within or associated with their computing/networking environments. Accordingly, in some cases, administrators may be overwhelmed by the sheer number of events coming from these many sources. Also, in some embodiments, commonly some (or many) events may be considered false positives in that they may be safely ignored or they may be incorrectly reporting a safe signal or safe condition as being unsafe.

Further, in some cases, modern computing environments may often be dynamic with computers (e.g., virtual computers, container-based services, personal computing devices) joining or leaving the networks. Similarly, in some embodiments, networks for some organizations may dynamically be adding physical devices, services, applications, or the like, depending on local circumstances or local requirements.

Accordingly, in some cases, organizations may be required to manually determine which events may be considered actionable. In this case, manual determination may include the creation or deployment of filters, classifiers, or the like, that are directed to particular known false positive events. However, in some cases, administrators for organizations may be required to validate/verify many events to determine which events may be false positives. Further, in some cases, such classification may require administrators to perform a wide-variety of ad-hoc operations to track down the source of the event or the source of the circumstances or conditions that may have triggered the event in the first place.

Conventionally, in some cases, administrators may be required to manually employ different internal services or external services that may help classify incoming events. Further, in some cases, different administrators may approach event classification differently from one another such that different administrators may perform different actions or perform actions in an order of operation different from other administrators. Accordingly, in some cases, the veracity or quality of event classification may vary depending on personal preferences or individual biases rather than objective criteria or operations.

Accordingly, in some embodiments, events, such as, event 406, event 408, or event 410 may be provided to an ingestion engine, such as ingestion engine 404. In some embodiments, ingestion engines may be arranged to import event information from various sources, such as application/system health monitoring services, network security monitoring services, application log files, event aggregators, or the like. Accordingly, in some embodiments, ingestion engines may be arranged to employ one or more filters, parsers, transformers, interfaces, libraries, or the like, that may be directed to particular event sources. In some embodiments, ingestion engines may be arranged to associate one or more ingestion protocols or ingestion tools with particular event sources. For example, in some embodiments, an event aggregation application may publish an API that ingestion engines may employ to collect events. Likewise, for example, ingestion engines may be arranged to employ a custom log file parser that is directed to a customized event logging system. Accordingly, in some embodiments, ingestion engines may be arranged to employ instructions, filters, parsers, transformers, interfaces, libraries, or the like, provided or determined via configuration information for ingesting events. Thus, in some embodiments, ingestion engines may be arranged to be adaptable to local requirements or local circumstances that may change over time.

In one or more of the various embodiments, ingestion engine 404 may be arranged to store event information in a data store, such as event store 424. Accordingly, in some embodiments, analysis engines may be provided a historical record of some or all events that have been ingested by ingestion engines.

In one or more of the various embodiments, analysis engine 402 may be arranged to evaluate some or all events to determine if some events may be ignored or otherwise automatically resolved while other events may be determined to require human intervention or otherwise be escalated. One of ordinary skill in the art will appreciate that classifying events may include categorizing events into two or more categories depending on local requirements or local circumstances. Accordingly, for brevity and clarity, analysis engines are described in terms of classifying events as false positive events or positive events, however, innovations disclosed herein are not so limited and analysis engines may be arranged to classify events using classification schemes that go beyond binary classification.

In some embodiments, analysis engines may be arranged to employ one or more management agents, such as, management agents 412 to begin or manage the operations executed to classify events. In some embodiments, management agents may work with one or more action agents, such as action agents 414. In some embodiments, action agents may be arranged to perform one or more particular tasks as part of evaluating events.

In some embodiments, management agents or action agents may be arranged to direct analysis engines to access various internal services or external services to analyze events. In this example, for some embodiments, evaluation service 418, evaluation service 420, or evaluation service 422 may be considered to represent one or more internal services or external services that may be employed to contribute to the analysis of events. For example, in some embodiments, an action agent may direct the analysis engine to use an external service to provide a risk-score for a network address associated with an event. Accordingly, for some embodiments, an action agent may generate instructions that include one or more API calls to internal or external services to provide supplemental evaluation for event classification. Also, in some embodiments, one or more action agents may be arranged to execute APIs of internal services or external services direct from the context of the agent or large language model rather than relying on the analysis engine to execute the API calls.

In one or more of the various embodiments, if one or more events have been classified, analysis engines may be arranged to generate one or more reports, such as event reports 416. In some embodiments, event reports may be considered machine-readable information that other reporting tools or reporting services may employ to generate reports, visualizations, interactive reports, or the like.

Figure 5:
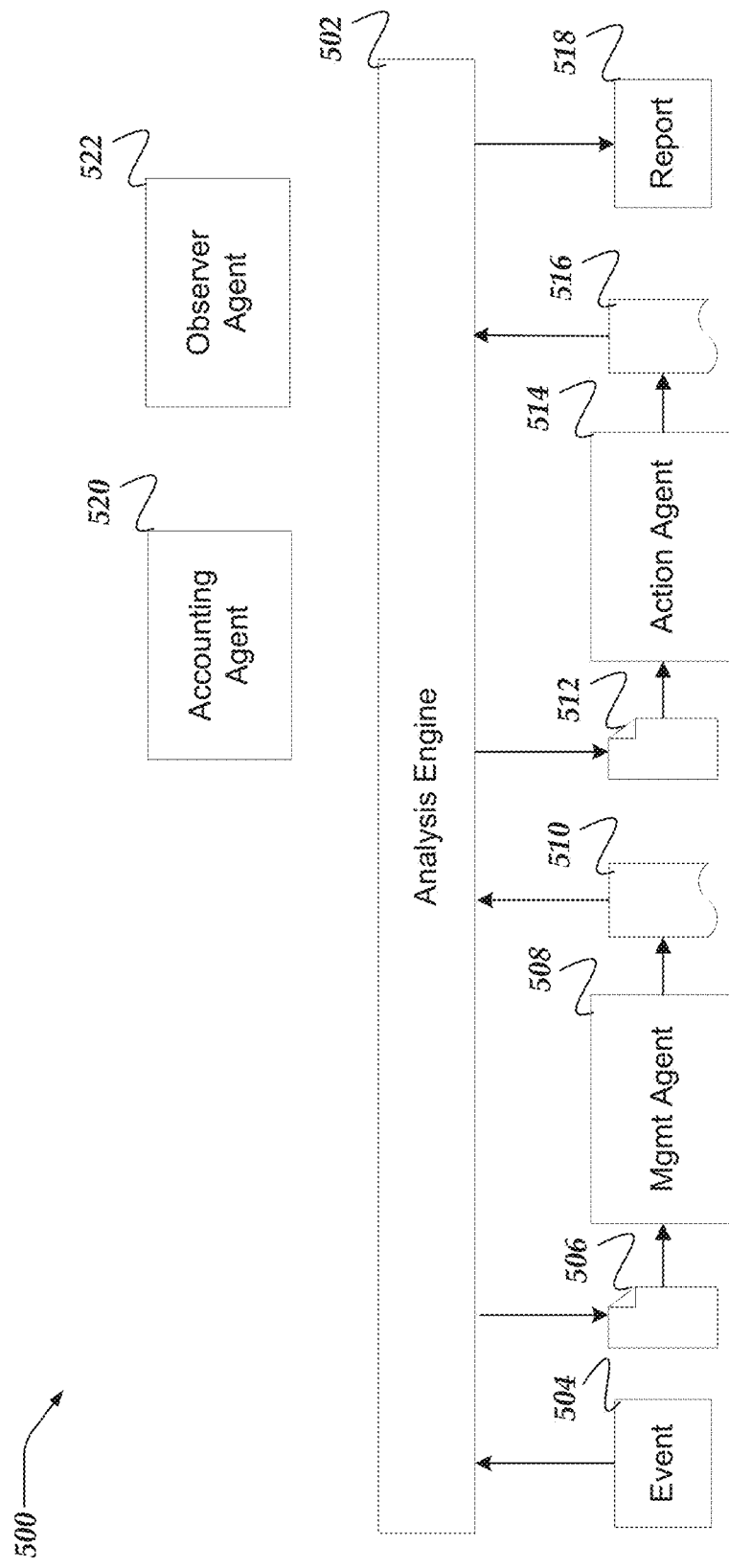
FIG. 5 illustrates a logical schematic of a system for security analysis agents in accordance with one or more of the various embodiments.

FIG. 5 illustrates a logical schematic of system 500 for security analysis agents in accordance with one or more of the various embodiments. Here, system 500 represents how events may be evaluated using analysis engines, management agents, action agents, or the like.

In one or more of the various embodiments, analysis engines 502 may be arranged to be provided event 504. Accordingly, in some embodiments, analysis engine 502 may be arranged to generate an initial prompt, such as prompt 506 that may be provided to management agent 508. In some embodiments, analysis engines may be arranged to modify an initial prompt template (not shown) to include event information associated with event 504. In some embodiments, the included event information may vary depending on the type of event, source of the event, or the like. For example, in some embodiments, if the event information for event 504 may include a text description that description may be included in the initial prompt. Likewise, in some embodiments, other event information such as network addresses, error/event codes, source information, time/date information, geographic information, or the like, may be included in initial prompts.

In some embodiments, initial prompts may be engineered to cause a large language model to generate a response that provides a framework for analysis engines to evaluate event 504. Accordingly, in some embodiments, response 510 may include instructions or other information (e.g., data in particular data structures) that enable analysis engines (or management agents) to generate one or more action prompts, such as action prompt 512. Also, in some embodiments, response 510 may include instructions for selecting one or more action agents that may correspond with the one or more action prompts.

Accordingly, in some embodiments, analysis engines may be arranged to provide action prompt 512 to action agent 514. In turn, for some embodiments, action agent may be arranged to generate action response 516 that includes information associated with the execution of one or more actions. In some cases, for some embodiments, action responses may include instructions that analysis engines may execute on-behalf of the agents. Also, in some embodiments, action responses may include results of one or more actions executed by the action agent itself rather than being limited to including instructions for performing actions outside of the action agent or large language models.

In some embodiments, analysis engines may be arranged to provide action responses to management agents to determine if the evaluation of the event has been completed. Accordingly, in some embodiments, if the management agent determines that an event is fully classified, the management agent may submit the event classification result to the analysis engine for reporting in a report such as report 518.

Also, in some embodiments, if management agents determine that additional evaluation may be required, management agents may generate additional action prompts that may be provided to the same or other action agents. Thus, in some embodiments, management agents may continue directing evaluation actions until it or the analysis engine determines that the event has been fully classified to the limits of the system.

In one or more of the various embodiments, one or more accounting agents, such as accounting agent 520 may be arranged to monitor various resources being used by (or associated with) various agents for processing events. Thus, in some embodiments, accounting agents may be arranged to report if one or more resources exceed one or more threshold values depending on local requirements or local circumstances. Accordingly, in some embodiments, analysis engines may be arranged to use information collected by accounting agent to determine how events may be evaluated. For example, for some embodiments, analysis engines may be configured to evaluate a sample of certain events rather than evaluating all of them. Accordingly, for example, an analysis engine may be configured to adjust sample rates based on resource consumption. Also, in some embodiments, analysis engines may be arranged to favor one or more action agents based on one or more metrics determined by accounting agents. For example, in some embodiments, an action agent directed to employing a particular external evaluation service may be disfavored or disabled if based on various metrics, such as, changes in responsiveness (e.g., latency), error rates, compute costs, API call costs, or the like. Also, in some embodiments, accounting agents may be arranged to track or monitor metrics associated with different event types, event sources, or the like. Also, in some embodiments, accounting agents may be arranged to monitor metrics for particular prompt templates, prompt fragment, or the like, such that prompt templates or prompt fragments that exceed resource quotas or fall below performance standards may be disfavored or discarded.

Also, in some embodiments, systems for security analysis agents, such as system 500 may include one or more other agents, such as observer agent 522, or the like. In some embodiments, observer agents may be considered agents that may be arranged or configured to track one or more features of the system. In some embodiments, observer agent 522 may be arranged to track how different agents may perform. In some embodiments, observer agent 522 may be arranged to monitor which agents have success classifying events. Further, in some embodiments, observer agents may be arranged to monitor information or statistics associated with evaluated events, such as, event source, event type, false positive rates, or the like.

Figure 6:
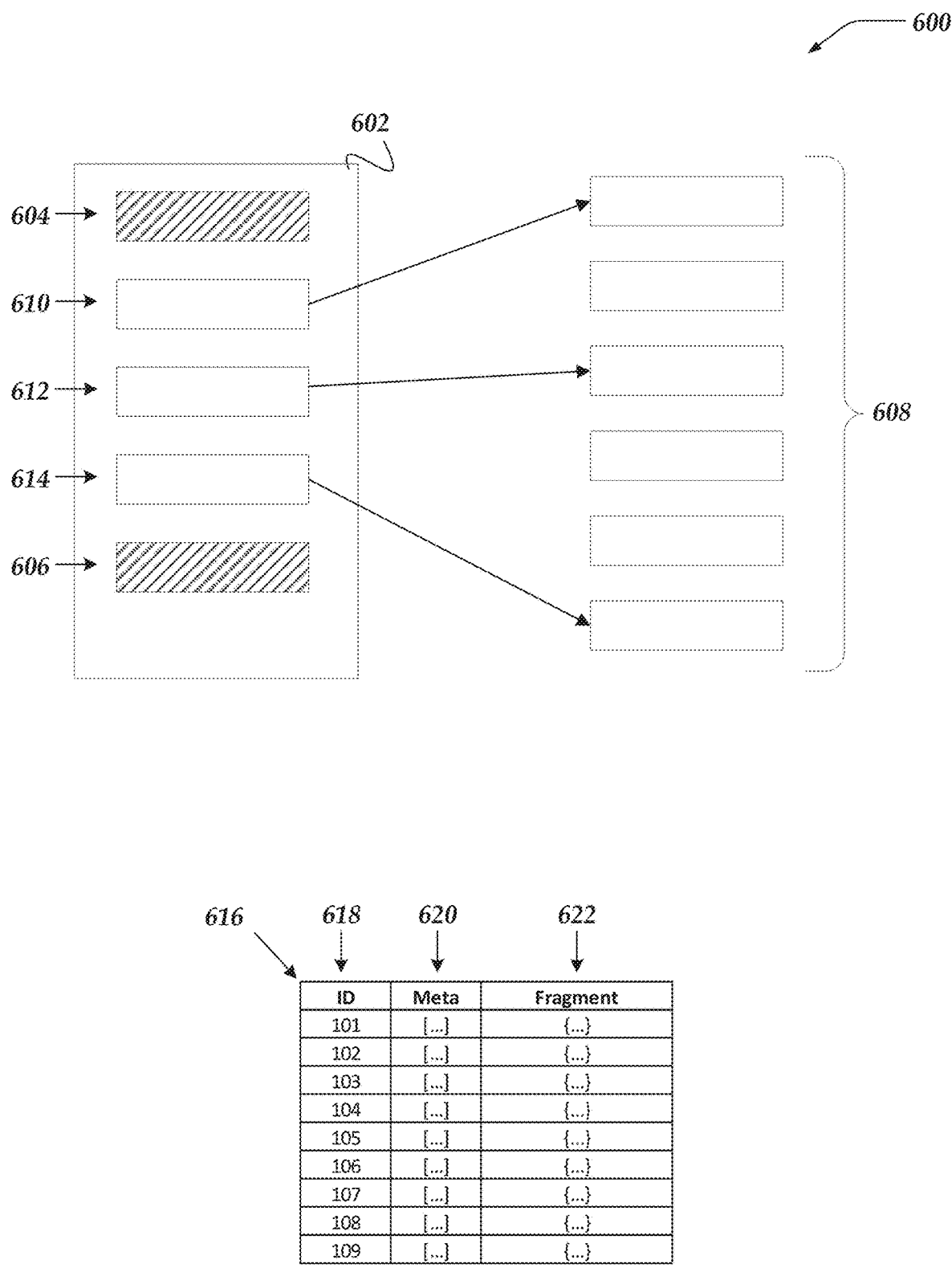
FIG. 6 illustrates a logical schematic of a system for security analysis agents in accordance with one or more of the various embodiments.

FIG. 6 illustrates a logical schematic of system 600 for security analysis agents in accordance with one or more of the various embodiments. In some embodiments, analysis engines may be arranged to compose prompts that include one or more prompt fragments. In some embodiments, prompt fragments may be provided in prompt templates or selected dynamically from a prompt fragment data store.

In this example, for some embodiments, prompt 602 represents a prompt that is composed of five prompt fragments such that prompt fragment 604 and prompt fragment 606 may be provided with a prompt template (not shown) and prompt fragment 610, prompt fragment 612, and prompt fragment 614 may be provided from a prompt fragment data store, such as, prompt fragment data store 608.

In one or more of the various embodiments, analysis engines may be arranged to select one or more prompt fragments based on one or more characteristics of an event, such as, event type, event source, label/description text, or the like. Also, in some embodiments, analysis engines may be arranged to select prompt fragments based on prompt responses. For example, in some embodiments, an analysis engine may use a response from a management agent to select one or more prompt fragments if generating action prompts.

In some embodiments, analysis engines may collect prompt fragments and information about prompt fragments in a prompt fragment data store such as table 616. In this example, for some embodiments, table 616 includes column 618 for storing an identifier of prompt fragments, column 620 for storing various meta-data about prompt fragments, column 622 for storing the prompt fragments that may be injected into prompts. Note, in some embodiments, other columns (not shown) may be provided to record particular metrics that may be of interest depending on local requirements or local circumstances. Likewise, in some embodiments, column labeling or ordering in prompt fragment data stores may vary depending on local requirements or local circumstances. Also, in some embodiments, Further, data structures or data stores for collecting prompt fragments or prompt fragment information are not limited to tables or tabular data structures. For example, other data stores, such as key value stores, or the like, may be used for storing prompt fragments or for storing information associated prompt fragments.

In some embodiments, prompt fragment data stores may store meta-data about prompt fragments, such as, one or more characteristics regarding a prompt fragment, such as, key words, event types, user/custom tags, priority/preference categories, usage counts, quality scores, or the like.

In some cases, metrics such as quality scores may be determined based on user feedback given during training sessions or user feedback collected during production operations. Accordingly, in some embodiments, user interaction telemetry may be collected passively by observing if the results for a prompt are accepted by the user. For example, if a user is observed continuing to manually evaluate an event, after the analysis engine has given its recommendation, it may indicate that the user was not satisfied with the results associated with a prompt or one or more prompt fragments.

In some embodiments, performance scores for each prompt fragment may be determined based on one or more metrics such that the one or more metrics include one or more of latency, correctness, resource consumption, cost, event type applicability, redundancy, or the like. In some embodiments, performance scores may encapsulate various metrics or other considerations that may be considered for evaluating the performance or suitability of prompt fragments, prompt fragment parts, or agents. In some cases, performance scores may be comprised of partial scores that may be evaluated together in aggregate. Also, in some embodiments, performance scores may represent or include classifications or categorizations of responses or response portions associated with particular prompt fragments, prompt fragment parts, agents, or the like. For example, in some embodiments, security analysis systems may include one or more heuristic classifiers, machine-learning classifiers, or the like, to categorize or otherwise evaluate the performance of prompt fragments, prompt fragment parts, agents, or the like. For brevity and clarity, these various types of performance evaluators may be referred to herein as performance scores. Likewise, if a performance evaluation is described in terms of exceeding or falling below a threshold, one of ordinary skill in the art will appreciate the determining the threshold or threshold value may be based on more than one sub-score, performance evaluation, suitability evaluations, event categorization, response classification, or the like, rather than being strictly limited to a single numeric value.

Figure 7:
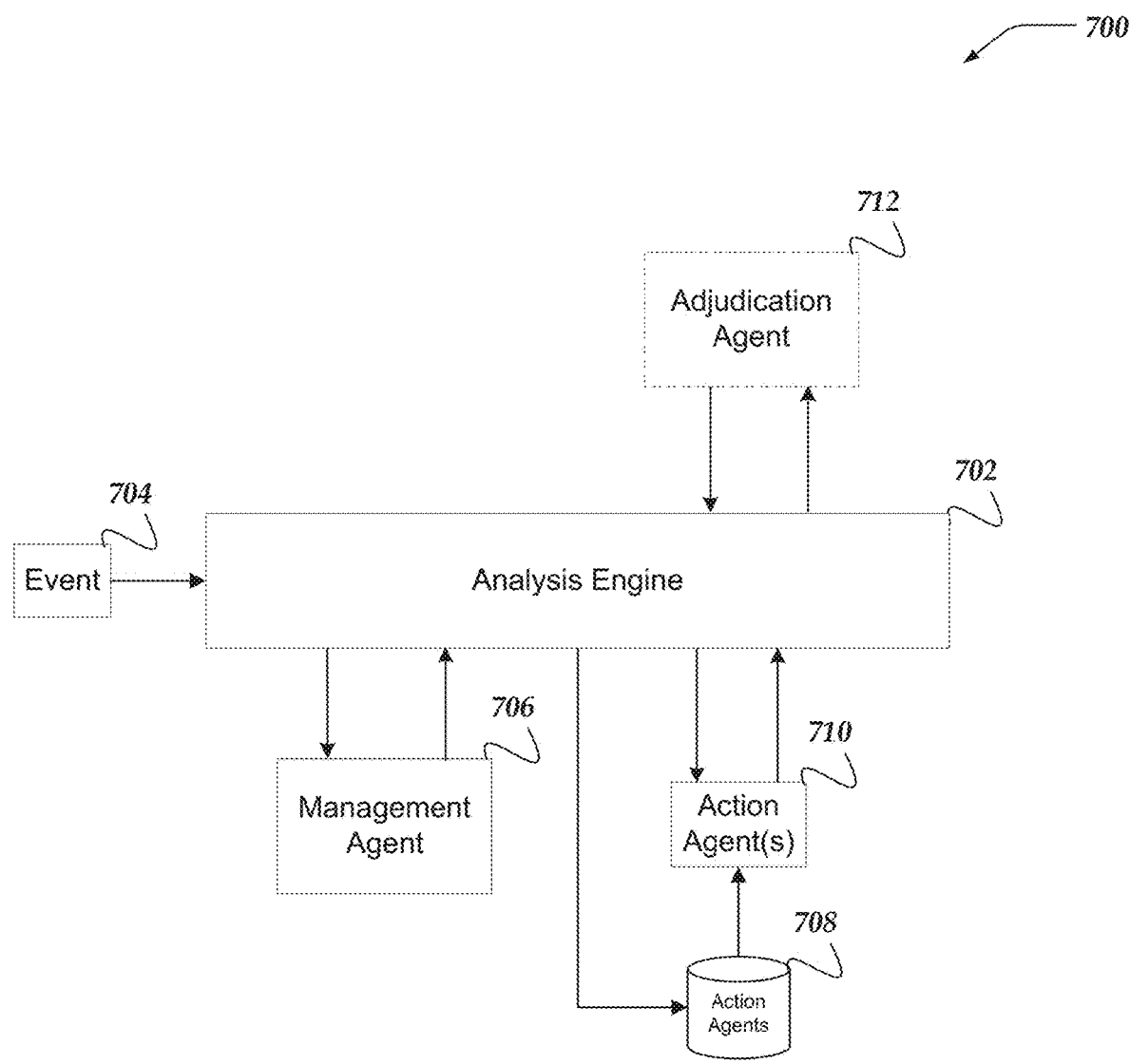
FIG. 7 illustrates a logical schematic of a system for security analysis agents in accordance with one or more of the various embodiments.

FIG. 7 illustrates a logical schematic of system 700 for security analysis agents in accordance with one or more of the various embodiments. In some embodiments, analysis engines, such as analysis engine 702 may be arranged to receive one or more events, such as event 704. As described above, analysis engines may be arranged to evaluate various characteristics of events to make one or more determinations or categorizations of the event. In these examples herein, analysis engines may be described as evaluating if events may be false positives or otherwise ignorable. Accordingly, in some embodiments, information included with events or associated with events may be examined to determine if the conditions or circumstances that underlie the event may require further interventions or notifications.

For example, for some embodiments, if an event is associated with a user trying download data from an unknown (non-authorized) external network address, analysis engines may be arranged to submit the external network address to one or more internal services or external services that may determine a risk (threat) level for the external network address. Thus, in this example, if the external network address is determined to be associated with an unacceptable risk level, the event may be indicated as being a positive event that may require further intervention. Likewise, in this example, if the external network address is determined to be safe, the event may be determined to be a false positive (because in this example, it may be considered ignorable).

In view of the dynamic nature of events, event types, event information, changing threat landscapes, dynamic networking environments (e.g., cloud computing, BYOD workplaces, or the like), dynamic local requirements, or the like, it may be difficult to determine which actions should be performed for evaluating events. For example, in some embodiments, the risk level of network addresses or ranges of network addresses may vary, where once safe network addresses may be later considered unsafe. Likewise, for example, in some embodiments, threats that are of no concern may become relevant as changes are made to an organization's information technology infrastructure.

Accordingly, in some embodiments, analysis engines may be arranged to employ one or more agents to conduct investigative activity, such as: performing actions to evaluate events; directing one or more internal services or external services to evaluate events; or the like. In one or more of the various embodiments, agents may be considered processes, services, containers, virtual machines, applications, or the like, that may perform various actions for evaluating events.

In one or more of the various embodiments, if analysis engines may be provided an event, analysis engines may submit the event (and event information) to a management agent, such as, management agent 706. Accordingly, in some embodiments, management agent 706 may determine one or more courses of actions based on the event information. In some cases, for some embodiments, management agents may be enabled to complete the evaluation of the event. For example, if it is well known that a particular event type from a particular source is always a false positive, management agents may use that information to determine that the event is a false positive event. However, in some embodiments, often events may require more in-depth analysis to determine if the event is a false positive event or not. In such circumstances, management agents may be arranged to select one or more action agents that may be directed to perform one or more actions to evaluate events. In this example, for some embodiments, management agent 706 may select one or more action agents, such as, action agent 710 from a collection of action agents, such as, action agent collection 708.

In some embodiments, analysis engines may be arranged to generate an initial prompt based on an initial prompt template or framework where some or all of the event information may be included in the initial prompt. Accordingly, in this example, for some embodiments, analysis engine 702 may generate an initial prompt based on event 704. In some embodiments, analysis engine 702 may submit the initial prompt to management agent 706. Accordingly, in some embodiments, management agent 706 may submit this initial prompt to a large language model that returns an initial response.

In some embodiments, the initial response may include instructions for selecting one or more action prompts that may be engineered for one or more particular action agents. In some embodiments, analysis engines may be arranged to obtain the initial response from management agent 706 and generate the one or more action prompts based on information or instructions included in the initial response. For example, in some embodiments, an initial response may include one or more portions that describe the result of initial evaluation by the management agent while one or more other sections may include instruction for generating action prompts engineered for one or more particular action agents. For example, in some embodiments, results of initial evaluation by the management agents may include, status information, performance information (e.g., latency, cost information, resource consumption information, or the like), reporting narratives, or the like.

In one or more of the various embodiments, action agent 710 may be provided an action prompt that includes event information as well as other information selected for guiding large language models to evaluate event 704.

In one or more of the various embodiments, action agent 710 may be arranged to generate an action response that may be indicated if the event is a false positive. In some cases, for some embodiments, if an action agent may be unable to evaluate the event or the result of its evaluation may be indefinite, the action response may indicate this result. Likewise, in some embodiments, if the action agent determines that the event is a positive event, the action response may indicate that result.

In some embodiments, action agents may include performance scores associated with different prompt fragments that contributed to the action response. Also, in some embodiments, individual action agents or action prompts may be associated with performance scores.

In one or more of the various embodiments, analysis engines may be arranged to evaluate action responses to determine if an analysis may be complete. Also, in some embodiments, analysis engines may be arranged to submit action responses to management agents such that the management agent may determine if the evaluation of the event may be complete. In such circumstances, analysis engines may generate another prompt that includes the action response information and provide this other prompt to the management agent.

In one or more of the various embodiments, analysis engines may be arranged to submit action response information to another agent, such as, adjudication agent 712. In some embodiments, adjudication agents may be agents dedicated to evaluating action responses to determine if the evaluation of an event should be deemed complete. Note, in this illustration, adjudication agent 712 is shown with dashed lines because in some cases other parts of the system, such as management agent 706 or analysis engine 702 may be arranged to perform this adjudication.

Figure 8:
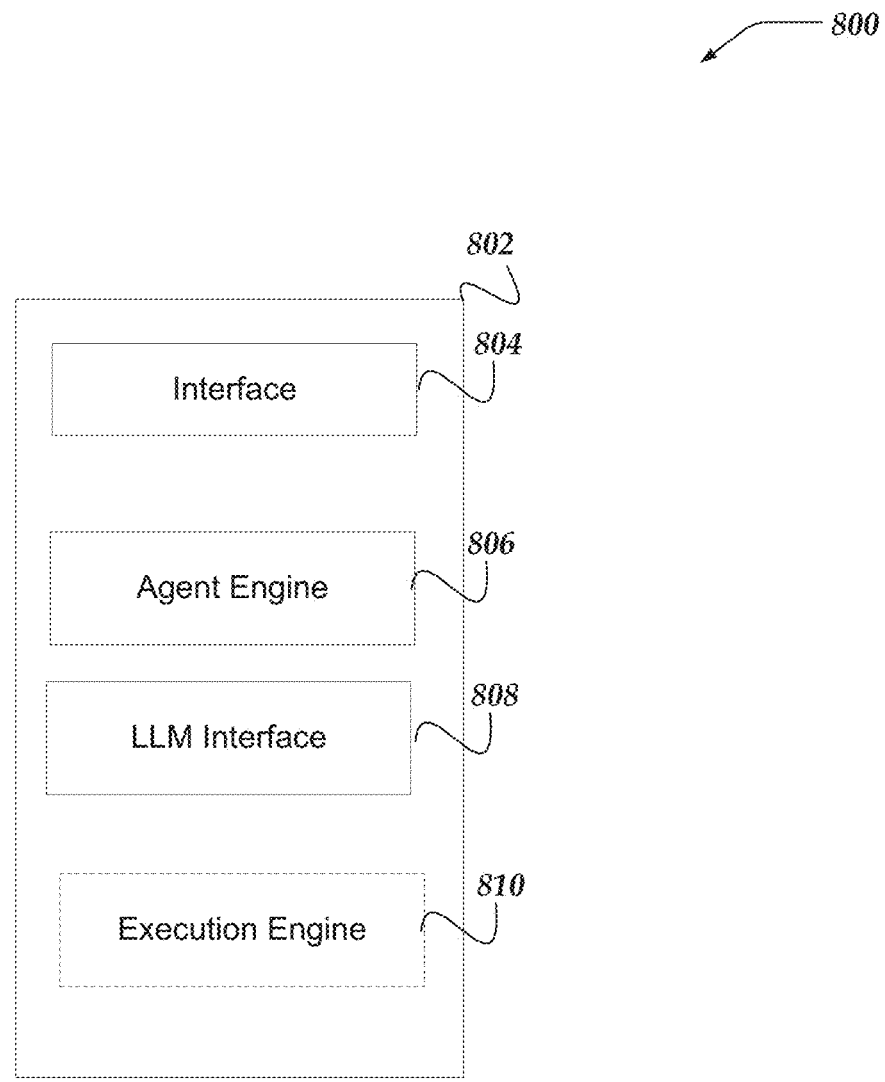
FIG. 8 illustrates a logical schematic of an agent for security analysis agents in accordance with one or more of the various embodiments.

FIG. 8 illustrates a logical schematic of agent 800 for security analysis agents in accordance with one or more of the various embodiments.

For some embodiments, agents may be described as thin-layers over an API to a large language model arranged for passing in prompts to large language models and obtaining responses from large language models. However, in some embodiments, agents may be arranged to perform additional operations, such as validating input to interfaces, assembling prompts, filtering or formatting large language model responses, or the like.

Accordingly, in one or more of the various embodiments, agents may be considered to comprise an agent container, such as, agent container 802, one or more interfaces, such as interface 804, one or more agent engines, such as agent engine 806, one or more large language model interfaces, such as, large language model interface 808. Note, one of ordinary skill in the art will appreciate than agents may include more or fewer components in various arrangements without departing from the scope of these innovations. For brevity and clarity many variations of agents are not discussed here. However, agent 800 and its description here and elsewhere in this writing are at least sufficient to describe and disclose these innovations.

In some embodiments, analysis engines may be arranged to provide agents information that the agents may use to generate prompts rather than providing the prompt itself. Accordingly, in some embodiments, agents may generate prompts internally based on parameters provided via interface 804. For example, in some embodiments, an analysis engine may provide a collection of prompt fragments, event information, or the like, that the agent may assemble into a prompt.

In some embodiments, action agents may be arranged to execute particular tasks. Accordingly, in some embodiments, action agents may include specialized instructions directed to that particular task. Alternatively, in some embodiments, action agents may be generic absent a specialized action prompt that may be provided to the action agents by analysis engines or management agents.

In some embodiments, agents may include an execution engine that may execute one or more actions based on a response from a large language model. For example, in some embodiments, an action agent designed for evaluating network addresses may supply the action prompt to a large language model to obtain an action response. Accordingly, in some embodiments, the action agent may be arranged to include an execution engine, such as, execution engine 810 that may execute actions that may be called out in the action response. For example, in some embodiments, an action response may include instructions for submitting event information to other services for evaluation. Accordingly, in this example, the execution engine for the agent may execute the actions declared in the action response. For example, if the action response declares that one or more calls to an external API should be performed, the execution engine may call those APIs and collect the results. Alternatively, in some embodiments, analysis engines may be arranged to provide the execution engine that executes instructions for actions that may be in responses. Thus, in this example, execution engine 810 is illustrated with dashed lines because in some cases it may not be present in some or all agents.

Figure 9:
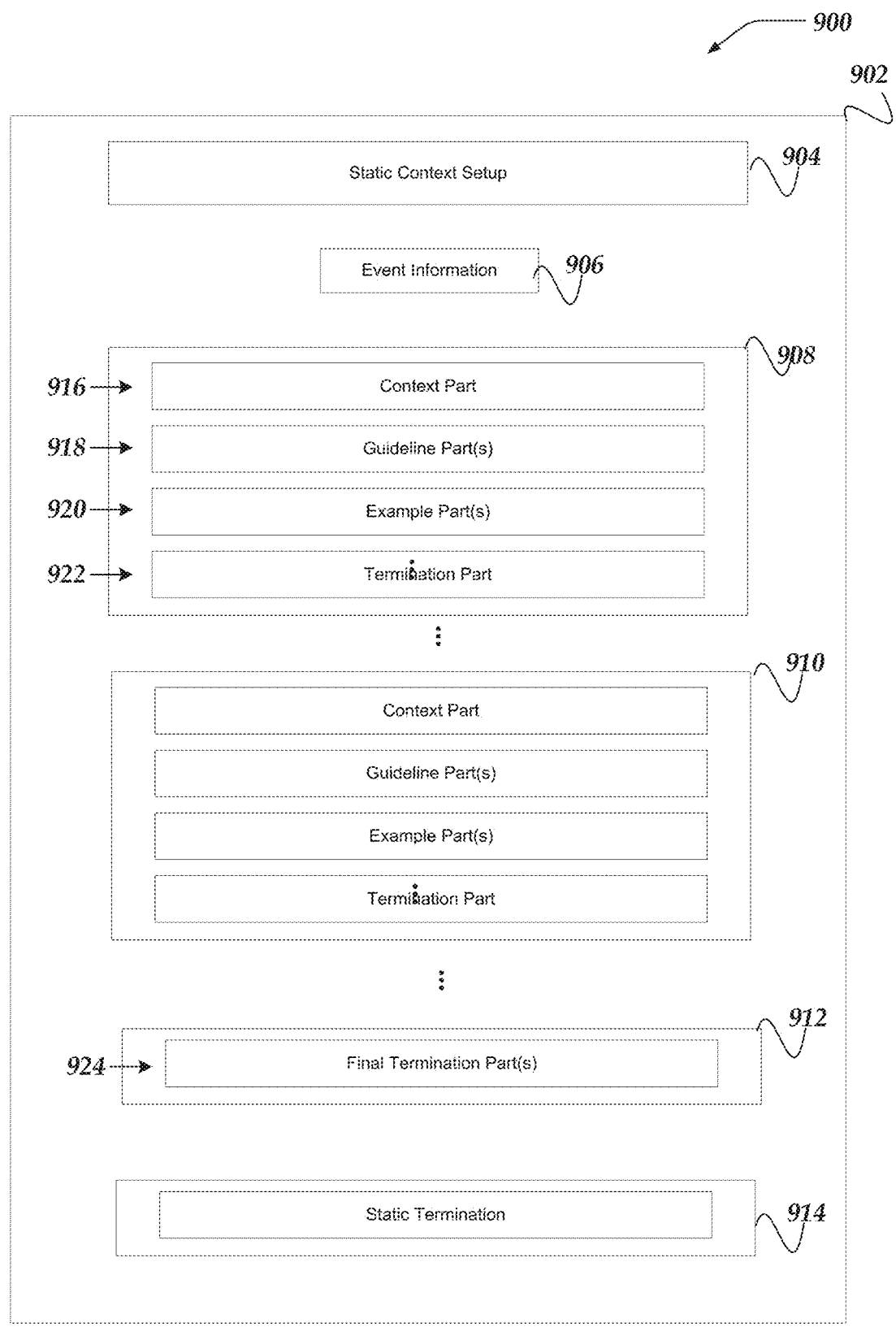
FIG. 9 illustrates a logical schematic of a prompt for security analysis agents in accordance with one or more of the various embodiments.

FIG. 9 illustrates a logical schematic of prompt 900 for security analysis agents in accordance with one or more of the various embodiments. As described above, analysis engines may be arranged to generate prompts for various agents. Management agents may be provided initial prompts; Action agents may be provided action prompts, and so on.

In one or more of the various embodiments, prompts may be composed of an arbitrary number of prompt fragments. In some cases, for some embodiments, one or more prompt fragments may be considered static fragments since they will be considered a permanent part of a prompt template or prompt framework. Note, different prompt templates (or prompting strategies) may include different static fragments. For example, prompt templates directed to answering particular types of questions or working with particular large language models may have different static prompt fragments from each other.

In one or more of the various embodiments, regular prompt fragments (non-static) may be selected for inclusion in a prompt by analysis engines. In some embodiments, analysis engines may be arranged to execute instructions provided in management agent responses to select prompt fragments to compose prompts for evaluating a particular event or class of events.

In one or more of the various embodiments, prompt fragments may be associated with one or more metrics that may be associated with the use or performance of the prompt fragment. Accordingly, in some embodiments, such metrics may be employed to inform management agents (for example) in selecting particular prompt fragments for including in a prompt.

Accordingly, in this example, for some embodiments, prompts, such as prompt 900 may comprise, prompt container 902. In some embodiments, prompt containers may be data structures that may include or organize prompt fragments, or the like, so they may be provided to a large language model.

In some embodiments, prompt container 902 may include static context fragment 904 and static termination fragment. In this example, for some embodiments these static prompt fragment may represent prompt fragments that may be always included in prompt 902. In some embodiments, prompt templates may declare one or more static prompt fragments.

Also, in this example, prompt 902 may include event information 906 which represents the information about the event that is being classified. In some embodiments, event information may include structured information, such as field names, codes, descriptions, labels, or the like, that are associated with the event being classified.

Also, in some embodiments, prompt 902 may include one or more prompt fragments, such as, prompt fragment 908, prompt fragment 910, prompt fragment 912, or the like.

Also, in some embodiments, each prompt fragment may include one or more prompt fragment parts, such as, fragment part 916, fragment part 918, fragment part 920, fragment part 922, or the like. In some embodiments, fragment part 916 may be considered to provide context/setup information relevant to the prompt fragment. Also, in some embodiments, fragment part 918 may be considered to provide guideline information relevant to the prompt fragment. Guideline information may include instructions that guide the large language model to execute or recommend tools for evaluating events. Also, in some embodiments, guideline information may include instructions that set limits, roles, expectations, or the like, for the large language model to apply if generating a response. In some embodiments, fragment part 920 may represent a portion of prompt fragment 908 that provides one or more examples that a large language model may employ to infer the type of response that is being sought. And, in some embodiments, fragment part 922 may represent text or tokens that should be applied by the large language model to results associated with the prompt fragment.

In some embodiments, prompts may include a non-static termination prompt fragment, such as, prompt fragment 912. In some embodiments, non-static termination prompt fragments may include termination prompt fragment parts, such as, fragment part 924 that may be included selectively in addition to static termination prompt fragment 914.

In one or more of the various embodiments, analysis engines may be arranged to record historical performance metrics associated with particular prompts, prompt templates, prompt fragments, or the like.

In one or more of the various embodiments, performance metrics may include response latency, response efficacy, query related information (e.g., event type, event source, or the like), time/date information, or the like. Accordingly, in some embodiments, prompt fragments may be selected for inclusion in a prompt based in part by the one or more recorded performance metrics.

Note, one of ordinary skill in the art will appreciate the prompts may include more or fewer prompt fragments each with more or fewer fragment parts that shown here. Specific prompt templates or individual prompt fragments may be determined experimentally according to local requirements or local circumstances. For example, one or more prompt fragments may be determined by experiment to be effective with a first large language model while other prompt fragments may be determined by experiment to be effective with a second large language model.

Figure 10:
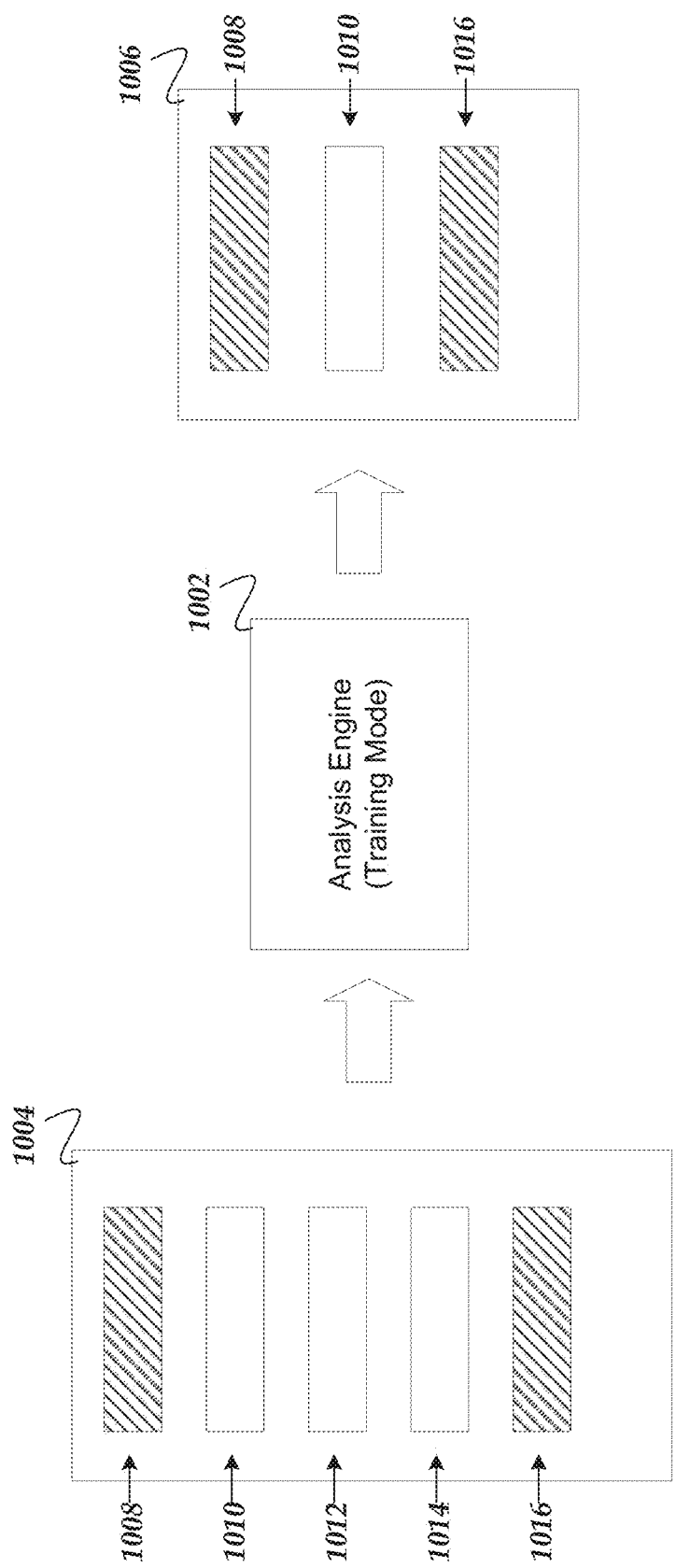
FIG. 10 illustrates a logical schematic of training a system for security analysis agents in accordance with one or more of the various embodiments.

FIG. 10 illustrates a logical schematic of training system 1000 for security analysis agents in accordance with one or more of the various embodiments. As described herein, analysis engines may be arranged to use training or reinforcement learning methods to generate prompts or prompt templates. In this example, prompt 1004 may be considered similar to prompt 602 described above. Accordingly, in some embodiments, prompt 1004 may include one or more prompt fragments, such as, static prompt fragment 1008, prompt fragment 1010, prompt fragment 1012, prompt fragment 1014, static prompt fragment 1016, or the like.

In some embodiments, analysis engines may be arranged to train prompts by observing which prompt fragments may provide results that are within one or more constraints or conditions. For example, an initial untrained prompt, such as prompt 1004 may be provided to a large language model such that the large language model's response may be evaluated by a training agent, or the like.

In some embodiments, prompts may be configured such that large language model response content associated with individual prompt fragments may be readily identified. In some embodiments, prompt 1004 may be configured such that a large language model will group response content into response fragments that correspond to each prompt fragment. For example, in some embodiments, providing prompt 1004 to a large language model may result in a response that includes response fragments that correspond to prompt fragments in the order they appear in the prompt. Accordingly, in some embodiments, training agents or other observer agents may readily be arranged to compare the performance of different prompt fragments within the prompt.

Accordingly, in some embodiments, prompt fragments that produce useful results may be scored higher than prompt fragments that produce less useful results. In some embodiments, prompt fragments that fall below a threshold score value may be automatically removed from a prompt or prompt template. Likewise, in some embodiments, one or more prompt fragments that may be determined to produce redundant results may be excluded.

Also, in some embodiments, performance metrics associated with each prompt fragment may be considered such that prompt fragments associated with one or more metric values that may indicate relatively poor performance may be identified. For example, in some embodiments, prompt fragments associated with one or more metrics that fall below a threshold value may be removed or excluded from prompts or prompt templates.

In this example, prompt 1006 represents the result of training prompt 1004 such that prompt fragment 1012 and prompt fragment 1014 were removed as a result of training.

In some embodiments, observer agents (not shown here) may be arranged to monitor how action agents may perform. Accordingly, in some embodiments, the associated prompts may be modified or adapted based on real-time performance outside of dedicated training sessions. For example, for some embodiments, if an observer agent determines that a first prompt fragment consistently reports the same answers as a second prompt fragment, the prompt fragment associated with a higher cost (e.g., latency, fees, resources, or the like) may be downgraded such that it may be less likely to be included in prompts.

Generalized Operations

Figure 11:
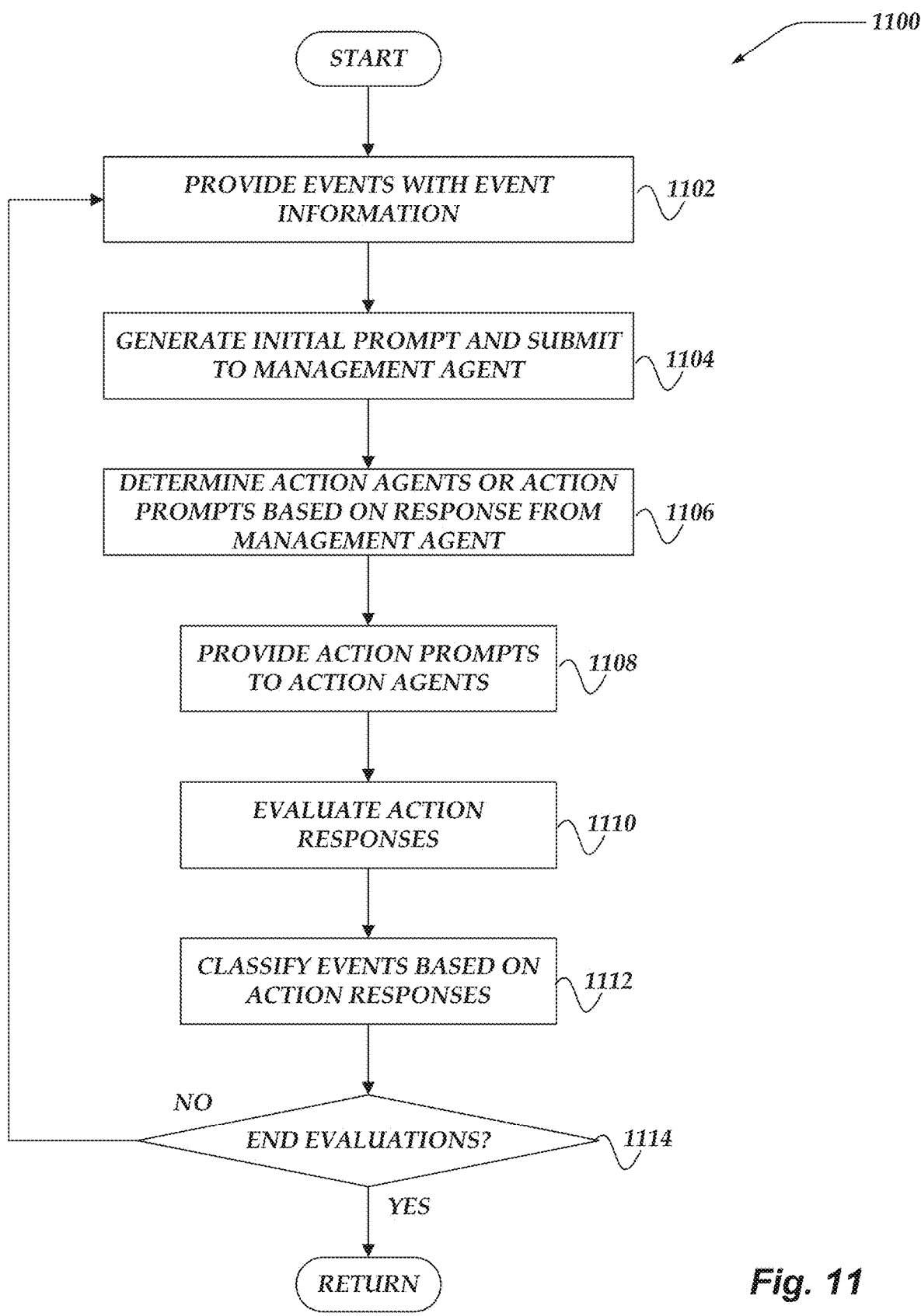
FIG. 11 illustrates an overview flowchart of a process for security analysis agents in accordance with one or more of the various embodiments.
Figure 12:
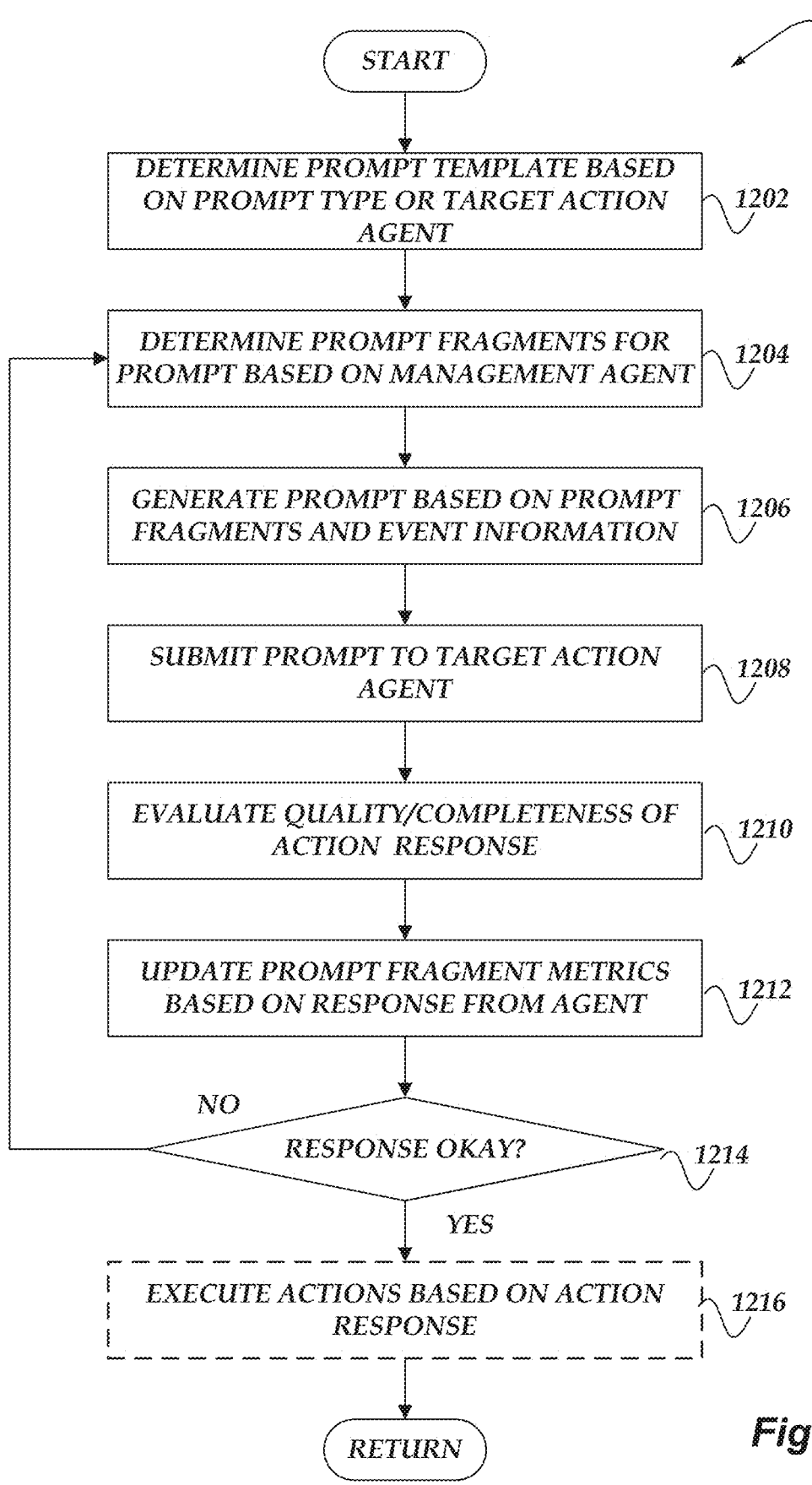
FIG. 12 illustrates a flowchart of a process for security analysis agents in accordance with one or more of the various embodiments.
Figure 13:
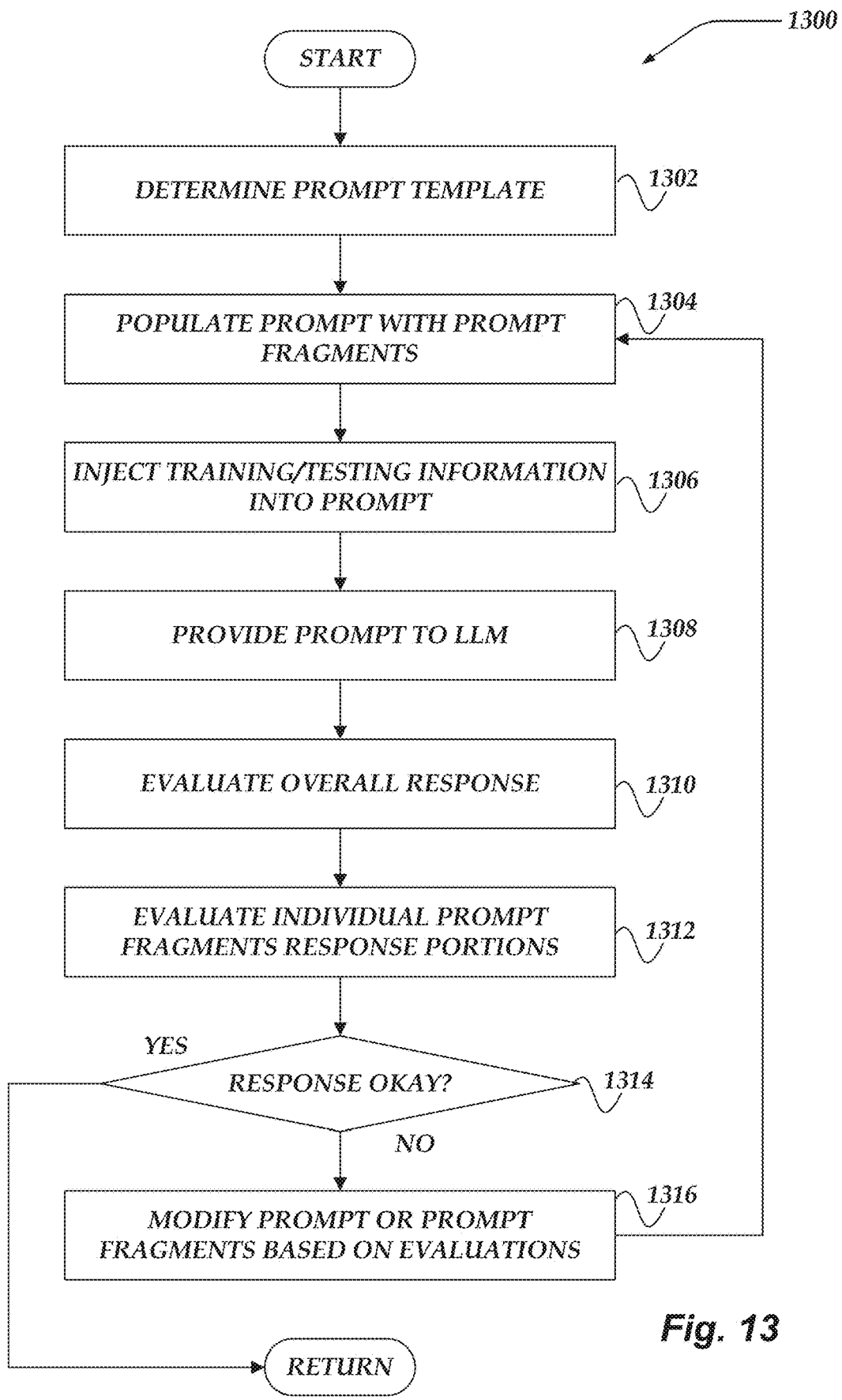
FIG. 13 illustrates a flowchart of a process for training security analysis agents in accordance with one or more of the various embodiments.

FIGS. 11-13 represent generalized operations for security analysis agents in accordance with one or more of the various embodiments. In one or more of the various embodiments, processes 1100, 1200, or 1300 described in conjunction with FIGS. 11-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 11-13 may be used for security analysis agents in accordance with at least one of the various embodiments or architectures such as those described in conjunction with FIGS. 1-10. Further, in one or more of the various embodiments, some or all of the actions performed by processes 1100, 1200, or 1300 may be executed in part by analysis engine 322, action agent(s) 324, management agents 326, training agents 327, or the like, running on one or more processors of one or more network computers.

FIG. 11 illustrates an overview flowchart of process 1100 for security analysis agents in accordance with one or more of the various embodiments. After a start block, at block 1102, in one or more of the various embodiments, one or more events with event information may be provided to analysis engines. As described above, in some embodiments, networking environments, or the like, may include one or more special purpose applications or devices that monitor various characteristics of an organization's technology infrastructure. These special purpose applications or devices may generate various events or event information in response to various conditions or occurrences associated with the monitored resources. Also, in some embodiments, other applications (e.g., databases, web servers, operating systems, or the like) may generate event or event information associated with the operation of the application.

Also, in one or more of the various embodiments, events may be provided via one or more event forwarder or event aggregation services rather than being collected from multiple sources.

As described above, in some embodiments, an ingestion engine may be arranged to process incoming events or event information. In some embodiments, ingestion engines may provide initial data cleaning or data annotation that generates additional event information that may be associated with an event. Also, in some embodiments, events or event information may be collected, cleaned, normalized, or the like, by an external service before the events may be provided the analysis engine.

At block 1104, in one or more of the various embodiments, analysis engines may be arranged to generate an initial prompt that may be submitted to a management agent. As described above, in some embodiments, analysis engines may generate a prompt that includes the event information and provide the initial prompt to a management agent that may submit the prompt to a large language model. As described above, in some embodiments, the initial prompt may be engineered to direct the large language model to generate a response that includes instructions for evaluating the event. Accordingly, in some embodiments, context information included in the initial prompt or its prompt fragments may direct the management agent to select one or more tools, action prompt templates, action prompt fragments, or the like, that may be employed to evaluate the event.

Also, in some embodiments, initial prompts may include guidelines or restrictions that enable the large language model to declare if the provided event may be eligible or disqualified from evaluation by the analysis engine. For example, in some embodiments, if a particular type of event or events from particular sources are known to be difficult or impossible for the analysis engine to evaluate, the initial prompt may include descriptions or examples of such events so that the large language model may generate a response that includes machine-readable instructions that reject excluded events from further consideration.

At block 1106, in one or more of the various embodiments, analysis engines may be arranged to determine one or more action agents or action prompts based on the response from the management agent. As described above, in some embodiments, if there may be more than one type of action agent available, initial prompts may be engineered such that the large language model may identify the particular action agent(s) that should be used to evaluate the event. Accordingly, in some embodiments, the response from the large language model to the initial prompt may include identifiers or other machine-readable indicators that may be used to select the action agents, prompt templates, prompt fragments, or the like, for evaluating the event further.

At block 1108, in one or more of the various embodiments, analysis engines may be arranged to provide the one or more action prompts to the one or more action agents. As described above, in some embodiments, analysis engines may be arranged to generate one or more action prompts based at least in part on the response from the management agent. In some embodiments, management agent responses may include machine-readable instructions that identify one or more action prompt templates, action prompt fragments, or the like, for evaluating the event.

At block 1110, in one or more of the various embodiments, analysis engines may be arranged to evaluate the one or more action responses. As described above, in some embodiments, action agents may generate action responses based on the action prompts. Accordingly, in some embodiments, analysis engines may be arranged to determine if the action responses may include large language model errors or otherwise were non-responsive. In some embodiments, analysis engines may be arranged to scan action responses for known error messages or error codes that may be associated with the large language model that generated the action responses. Also, in some embodiments, action responses may indicate that the action prompt or large language model may be unable to evaluate a particular event. For example, in some embodiments, an action response may indicate that the event information included in the action prompt is not recognized as an event that can be evaluated. In some embodiments, other errors may include 'empty' action responses, large language model time-outs, network connection issues, other resource exhaustion, or the like.

At block 1112, in one or more of the various embodiments, analysis engines may be arranged to classify the events based on the action responses. In one or more of the various embodiments, action responses may include machine-readable or machine executable instructions that the analysis engine may execute to evaluate the events. Also, in some embodiments, the action agent themselves may execute the evaluation instructions directly to evaluate the event.

In some embodiments, large language models may be enabled to execute evaluation actions (run external evaluation tools) directly while generating the action response. In such cases, for some embodiments, the action response may include the results of the event evaluation embedded in the response. Accordingly, in some embodiments, analysis engines may be arranged to parse action responses to extract the classification results of the event rather than executing calls to other evaluation tools.

At decision block 1114, in one or more of the various embodiments, if the event evaluation session may be terminated, control may be returned to a calling process; otherwise, control may loop back to block 1102.

FIG. 12 illustrates a flowchart of process 1200 for security analysis agents in accordance with one or more of the various embodiments. After a start block, at block 1202, in one or more of the various embodiments, analysis engines may be arranged to determine a prompt template based on a prompt type or target agent. As described above, in some embodiments, prompt templates may declare preset formats for generating a prompt directed to one or more large language models. Also, in some embodiments, prompt templates may be considered to be instructions, frameworks, or recipes for generating prompts rather than being limited being a template document that includes replaceable fields, fillable fields, pre-defined styling, pre-defined positioning, or the like, common to conventional document templates.

In some embodiments, analysis engines may include two or more prompt templates that may be directed to particular event types, organizational requirements, particular large language models, or the like. Accordingly, in some embodiments, analysis engines may be arranged to conduct an initial evaluation of incoming events to determine a prompt template. Note, in some embodiments, analysis engines may be configured to have a single prompt template that may be applied to incoming events.

In some embodiments, analysis engines may be arranged to execute prompt template selection rules that may determine a particular prompt template. Accordingly, in some embodiments, analysis engines may be arranged to employ rules, instructions, filters, or the like, declared in configuration information to determine a prompt template. Thus, in some embodiments, analysis engines may be enabled adapt prompt template selection actions to account for local requirements or local circumstances. Also, in some embodiments, users may be enabled to override prompt template selection rules or otherwise customize the configuration information used for selecting a prompt template.

Also, in some embodiments, analysis engines may be arranged to employ a specialized prompt that may be tuned to train (e.g., one-shot learning) a large language model to select or generate a prompt template. For example, in some embodiments, a large language model prompt may be engineered to generate or recommend a prompt template based on the event or event information. Note, in some embodiments, management agents, or the like, may be put through a training process dedicated to engineering a prompt for selecting prompt templates or generating prompt templates.

In one or more of the various embodiments, the particular prompt template that may be determined may change as analysis engines gain more experience or exposure to events that occur in a given environment. For example, in some embodiments, as historical information may be collected about an organization's networking environment, prompt template selection may change based on subsequent training sessions, learning based on real-time observation of the system in production, changes in user preferences/requirements, or the like, At block 1204, in one or more of the various embodiments, analysis engines may be arranged to determine prompt fragments for prompts based on management agents. As described above, analysis engines may be arranged to assemble prompts using one or more prompt fragments. In some embodiments, management agents may be arranged to determine the one or more prompt fragments based on the event information. In some embodiments, analysis engines may be arranged to employ a subordinate agent that may be arranged to select prompt fragments based on event information. Accordingly, in some embodiments, management agents or subordinate agents may employ a prompt that includes the event information such that the prompt may be provided to a large language model to determine prompt fragments.

Also, in some embodiments, prompt templates may be configured to include one or more prompt fragments. As described above, in some embodiments, some or all prompt fragments included in prompt templates may be considered 'boiler-plate' static prompt fragments that may be common to some or all prompt templates. However, in some embodiments, each different prompt template may include (or be associated with) particular prompt fragments such that selecting a prompt template also selects some or all of the prompt fragments.

Further, in some embodiments, analysis engines may be arranged to select prompt fragments based on one or more characteristics of the incoming events using rules, heuristics, instructions, conventional machine-learning classifiers, or the like, that may be determined or provided via configuration information.

In one or more of the various embodiments, the particular prompt fragments that may be determined may change as analysis engines gain more experience or exposure to events that may occur in a given environment. For example, in some embodiments, as historical information may be collected about a particular organization's networking environment, prompt fragment selection may vary based on subsequent training sessions, learning based on real-time observation of the system in production, changes in user preferences/requirements, or the like, At block 1206, in one or more of the various embodiments, analysis engines may be arranged to generate a prompt based on the determined prompt template, the one or more prompt fragments, and the event information. In some embodiments, analysis engines may be arranged to inject the prompt fragments into the prompt template. Also, in some embodiments, the prompt template may include the prompt fragments such that selecting the prompt template may be considered selecting the prompt fragments.

In addition to including the prompt fragments in the prompt, analysis engines may inject the event information into the prompt template to complete the prompt.

At block 1208, in one or more of the various embodiments, analysis engines may be arranged to submit prompt to target action agents. As described above, action agents may be arranged to have one or more interfaces to one or more large language models. Accordingly, in some embodiments, the one or more action agents selected for evaluating the event may be provided the prepared prompt. In some embodiments, large language models may be remote/external services (e.g., cloud-based SaaS) or in some embodiments, large language models may be local or otherwise under the control or management of the organization that is evaluating the events. For example, in some embodiments, an organization may have a local large language model that has been trained and tuned for a particular type of industry or otherwise trained to support one or more requirements or circumstances that may be unique the organization.

At block 1210, in one or more of the various embodiments, analysis engines may be arranged to evaluate the quality of one or more action responses. In some embodiments, large language models may be configured to generate a response based on the prompt. In some embodiments, analysis engines or action agents may be arranged to perform one or more actions to validate that the large language model was able to consume the prompt and generate a generally acceptable response. For example, in some cases, a large language model may respond with an error response because the large language model may be experiencing performance problems or otherwise fail to consume the prompt. Also, in some embodiments, the large language model may report that it cannot resolve the questions included in the prompt.

In some embodiments, this error checking step may help identify if the underlying features of the large language model have changed such that a prompt that it previously consumed without error may later produce an error. Also, in some embodiments, this block in process 1200 enables errors associated with latency, time-out, exceeding prompt size or context size limits, or the like, to be identified upfront.

In one or more of the various embodiments, analysis engines or action agents may be arranged to execute various tests to determine if a large language model has successfully consumed the prompt. Necessarily, the tests for determine prompt failure may vary depending on the underlying large language model, prompt type/template, event type, performance requirements, or the like. Accordingly, in some embodiments, analysis engines may be arranged to employ instructions, threshold values, rules, conditions, or the like, for identifying general errors based on configuration information to account for local requirements or local circumstances.

Further, in some embodiments, prompts may be configured such that large language models are trained to separate response information based on its corresponding prompt fragments. For example, in some embodiments, a prompt may be engineered such that the large language model may generate a partial response for each prompt fragment such that the response portion for each prompt fragment may be determined. For example, in some embodiments, if a first prompt fragment trains the large language model to employ a first evaluation tool and a second prompt fragment trained the large language model to employ a second evaluation tool, the response may identify or annotate the response such that response information that corresponds to the first prompt fragment may be determined separately from the response information that corresponds to the second prompt fragment.

Also, in some embodiments, one or more prompts may be engineered to track one or more metrics associated with each prompt fragment. Accordingly, in some embodiments, metrics associated with resource consumption (CPU, network, or memory), latency, or the like. For example, in some embodiments, context parts of a prompt fragment may instruct the large language model to track and report the amount of time it takes to generate a response to the prompt fragment. Note, in some embodiments, the type of metrics that may be collected may be influenced based on the features or the large language models being employed. For example, some large language model APIs may enable prompts or calling agents to include queries for some metrics while other large language model APIs may omit such features.

Accordingly, in some embodiments, analysis engines may be arranged to evaluate the contribution of each prompt fragment individually. For example, in some embodiments, two or more prompt fragments may be expected to provide a same or similar response portion. Thus, in some embodiments, analysis engines may determine which prompt fragments agree and which prompt fragments disagree. Also, in some embodiments, comparing the response portions may identify one or more prompt fragments that may be considered outliers.

At block 1212, in one or more of the various embodiments, analysis engines may be arranged to update one or more metrics from one or more prompt fragments based on action responses. In one or more of the various embodiments, prompt fragments or information about prompt fragments may be stored in a prompt fragment data store. Accordingly, in some embodiments, metrics associated with the use or performance of individual prompt fragments (or prompt templates) may be recorded for future use. For example, in some embodiments, prompt fragments that introduce latency above a defined threshold value may be excluded from some future prompts to improve performance.

Also, in some embodiments, metrics may include success, failure, or a quality score based on evaluating corresponding response information. Thus, in some embodiments, one or more prompt fragments may be excluded from future use if their failure rate exceeds a threshold value.

At decision block 1214, in one or more of the various embodiments, if the action responses provide a satisfactory evaluation, control may flow to block 1216; otherwise, control may loop back block 1204.

At block 1216, in one or more of the various embodiments, optionally, analysis engines may be arranged to execute one or more actions based on the one or more action responses.

In one or more of the various embodiments, prompts may be engineered to direct large language models to generate response information that includes instructions for performing one or more actions outside of the context of the large language model. For example, in some embodiments, an action prompt may direct a large language model to select one or more evaluation tools for evaluating the event. Accordingly, in some embodiments, the action response may be code, instructions, command-line commands, or the like, for executing the one or more evaluation tools to complete the evaluation of an event. In some embodiments, the action prompt may direct the large language model to select the particular tool API and the accompanying parameters for evaluating the event.

Accordingly, in some embodiments, analysis engines or action agents may be arranged to execute instructions included in the action response to evaluate the event.

In some embodiments, some large language models may be enabled to access one or more of the evaluation tools as part of interpreting the prompt. Thus, in some embodiments, rather than creating machine-readable instructions to execute the tools, the large language model may execute the tools itself and report the results in the action response rather including instructions for executing the tools outside of the large language model.

Note, this block is indicated as being optional because is some embodiments, large language models may be enabled to execute some or all response actions within the context of the large language model rather than having to execute them outside the large language model.

Next, in one or more of the various embodiments, control may be returned to a calling process.

FIG. 13 illustrates a flowchart of process 1300 for training security analysis agents in accordance with one or more of the various embodiments. After a start block, at block 1302, in one or more of the various embodiments, analysis engines may be arranged to determine a prompt template for training. In one or more of the various embodiments, administrators may select a training prompt template based on the goals of the testing session. For example, in some embodiments, organizations may experimentally engineer training prompt templates and chose the prompt template that works well for their circumstances. Likewise, in some embodiments, analysis engines may be arranged to employ generic empty prompt templates that just include static prompt fragments, such as, some initial context information for the large language model and a static termination prompt fragment.

At block 1304, in one or more of the various embodiments, analysis engines may be arranged to populate the prompt with one or more prompt fragments.

In some embodiments, analysis engines may be arranged to execute training sessions to determine which prompt fragments should be used for evaluating different events.

In some embodiments, prompt fragments may be obtained from a prompt fragment data store. In some embodiments, analysis engines may be arranged to select all prompt fragments, a random sample of prompt fragments, a selection of prompt fragments that meet one or more requirements. For example, in some cases, rather than 'selecting' a portion of prompt fragments from the data store, all the prompt fragments may be selected for including in the prompt. In contrast, in some embodiments, analysis engines may randomly select one or more prompt fragments to include in the prompt. Or, in some embodiments, analysis engines may select particular prompt fragments from the prompt fragment data store. For example, in some embodiments, analysis engines may be arranged to select untested prompt fragments from the data source for training.

In some embodiments, the purpose of training may be to determine a minimum set of prompt fragments that enable events of various types to be evaluated. For example, different prompt fragments may be associated with particular evaluation tools. Automatically using all of the tools to evaluate all events may be expensive or otherwise wasteful in terms of resources consumed or cost. Thus, for example, running a training session with different prompt fragments may identify evaluation tools or other actions that may be omitted for particular events or event types.

At block 1306, in one or more of the various embodiments, analysis engines may be arranged to inject training information (training events) or testing information (test events) into the prompt template to generate the prompt. In one or more of the various embodiments, organizations may select one or more events from a historical collection of previously occurring events. Also, in some embodiments, organizations may generate one or more synthetic events using various off-the-shelf or customs tools. In some embodiments, test events may be selected from actual real-time events as they come into the system for evaluation. Accordingly, in some embodiments, training or testing of prompt templates or prompt fragments may occur while other events are being evaluated by the system.

At block 1308, in one or more of the various embodiments, analysis engines may be arranged to submit the prompt to one or more large language models. As described above, training agents may be arranged to accept prompts and submit them to one or more large language models via one or more interfaces or APIs.

At block 1310, in one or more of the various embodiments, analysis engines may be arranged to evaluate the overall response of the prompt. In one or more of the various embodiments, training agents may provide large language model responses to training prompt to the analysis engine so the analysis engine may evaluate the training response. Also, in some embodiments, training agents may be arranged to evaluate the response themselves rather than relying on the analysis engine.

Similar to evaluating action responses, as described above, in some embodiments, analysis engines or training agents may be arranged to validate that the large language model was able to consume the training prompt and generate a generally acceptable response. For example, in some cases, a large language model may respond with an error response because it may experience performance problems or otherwise fail to consume the prompt. Also, in some embodiments, the large language model may report that it cannot resolve the questions (prompt fragments or event information) included in the prompt.

At block 1312, in one or more of the various embodiments, analysis engines may be arranged to evaluate individual prompt fragments that may be included in the prompt. As described above, in some embodiments, portions of the response corresponding to individual prompt fragments may be examined for errors, determinable (machine-readable) instructions, or the like. Also, in some embodiments, analysis engines may be arranged to collect various metrics that represent performance or quality characteristics of the individual prompt fragments.

For example, in some embodiments, correctness may be tested by providing test events that have known qualities that the prompt fragments should identify or respond to. Likewise, in some embodiments, performance or quality metrics associated individual prompt fragments may compared to metrics of other prompt fragments or performance threshold values, or the like. In one or more of the various embodiments, analysis engines may be arranged to generate a performance score for each prompt fragment or a performance score for the training prompt as a whole.

At decision block 1314, in one or more of the various embodiments, if the response or prompt fragments response portions are satisfactory, control may be returned to a calling process; otherwise, control may flow to block 1316. In some embodiments, analysis engines may be arranged to update metrics for prompt fragments that are determined to satisfy the testing/training criteria. Also, in some embodiments, analysis engines may be arranged to record which collection of prompt fragments may be used together. For example, an initial training prompt may include 20 different prompt fragments. In this example, a training session may identify that four of the twenty prompt fragments are useful for classifying particular events or event types. Accordingly, in this example, for some embodiments, the analysis engine may update the prompt fragment data store to that effect.

Also, in some embodiments, a prompt template that may include the qualified prompt fragments may be stored for use in production environments.

In one or more of the various embodiments, analysis engines may be arranged to determine if a prompt fragment or training prompt may be satisfactory based on their respective performance scores.

At block 1316, in one or more of the various embodiments, analysis engines may be arranged to modify the or prompt fragment based on the evaluations. Next, in some embodiments, control may loop back to block 1304.

For example, in some embodiments, analysis engines may be arranged to remove one or more under-performing prompt fragments from the training prompt. Likewise, in some embodiments, the analysis engine may be arranged to add one or more prompt fragments. Further, in some embodiments, analysis engines may be arranged to modify the contents (e.g., modify, add, or remove different fragment parts) of prompt fragments rather than adding or removing whole prompt fragments.

In some embodiments, analysis engines may be arranged to evaluate performance scores associated with individual prompt fragments to determine if prompt fragments should be removed from a training prompt or included in the training prompt. Also, in some embodiments, the performance score that may be associated with the training prompt may be used to determine if the changes to prompt fragments in the training prompt may be converging on a solution. For example, in some embodiments, if adding or removing a prompt fragment lowers the performance score of a training prompt, the analysis engine may be informed that the removed prompt fragments should be added back the prompt. Likewise, in some embodiments, if the performance does not change or improves, the analysis engine may confirm that the removed prompt fragments are not useful for evaluating the test events.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring activity in a computing environment using one or more processors to execute instructions that are configured to cause actions, comprising:
    determining one or more prompt fragments based on one or more events;
    generating a prompt for a large language model (LLM) to include the one or more prompt fragments based on the one or more events and one or more historical performance metrics; and
    employing the prompt to train the LLM to perform further actions, including:
        employing a response provided by the trained LLM to determine one or more actions to execute and evaluate the one or more events for classification;
        determining a performance score for each prompt fragment based on a corresponding portion of the response, wherein the determination performs further actions, including:
            generating one or more synthetic events based on one or more scenarios associated with one or more expected classifications;
            modifying the prompt to include the one or more synthetic events, wherein the modified initial prompt is employed by the LLM to generate another response; and
            updating the performance score for each prompt fragment based on a comparison of one or more other portions of the other response to the expected classification of each synthetic event; and
    employing the modified prompt to retrain the LLM to execute one or more other actions and evaluate one or more other events for classification.

2. The method of claim 1, further comprising:
    employing one or more of an analysis engine or a management agent to generate one or more action prompts having a framework that is based on the response; and
    employing one or more action agents to execute one or more actions and generate one or more action responses based on execution of the one or more action prompts.

3. The method of claim 1, further comprising:
    employing one or more action agents to directly execute instructions for an application programming interface (API) based on a context of the LLM or the one or more action agents, wherein the API is associated with one or more of an external service or an internal service.

4. The method of claim 1, further comprising:
    employing one or more adjudication agents to determine completion of evaluation of one or more events based on one or more action responses.

5. The method of claim 1, further comprising:
evaluating each prompt fragment included in the prompt based on its individual performance score, wherein a result of the evaluation causes performance of further actions including:
removing a prompt fragment from the prompt due to an individual performance score being below a threshold level during training of the prompt or real time performance outside training of the prompt.

6. The method of claim 1, further comprising:
selecting the one or more prompt fragments for inclusion in the prompt based on one or more of a network heuristic, a real time metric, a user preference, the response provided by the trained LLM or a requirement.

7. The method of claim 1, further comprising:
employing one or more of an ingestion engine or an ingestion agent to process incoming event data that is provided by another service, wherein the other service provides for one or more of collection, cleaning, or normalizing of the incoming event data.

8. The method of claim 1, further comprising:
employing one or more analysis engines to generate one or more a report, a visualization, or an interactive report for one or more of the evaluated events or all events that are ingested.

9. The method of claim 1, further comprising:
employing one or more action agents to direct an external service to provide a risk score for a network address associated with the one or more events.

10. A network computer for monitoring activity in a computing environment, comprising:
memory that stores at least instructions; and
one or more processors that execute instructions that are configured to cause actions, including:
determining one or more prompt fragments based on one or more events;
generating a prompt for a large language model (LLM) to include the one or more prompt fragments based on the one or more events and one or more historical performance metrics; and
employing the prompt to train the LLM to perform further actions, including:
employing a response provided by the trained LLM to determine one or more actions to execute and evaluate the one or more events for classification;
determining a performance score for each prompt fragment based on a corresponding portion of the response, wherein the determination performs further actions, including:
generating one or more synthetic events based on one or more scenarios associated with one or more expected classifications;
modifying the prompt to include the one or more synthetic events, wherein the modified initial prompt is employed by the LLM to generate another response; and
updating the performance score for each prompt fragment based on a comparison of one or more other portions of the other response to the expected classification of each synthetic event; and
employing the modified prompt to retrain the LLM to execute one or more other actions and evaluate one or more other events for classification.

11. The network computer of claim 10, further comprising:
employing one or more of an analysis engine or a management agent to generate one or more action prompts having a framework that is based on the response; and
employing one or more action agents to execute one or more actions and generate one or more action responses based on execution of the one or more action prompts.

12. The network computer of claim 10, further comprising:
employing one or more action agents to directly execute instructions for an application programming interface (API) based on a context of the LLM or the one or more action agents, wherein the API is associated with one or more of an external service or an internal service.

13. The network computer of claim 10, further comprising:
employing one or more adjudication agents to determine completion of evaluation of one or more events based on one or more action responses.

14. The network computer of claim 10, further comprising:
evaluating each prompt fragment included in the prompt based on its individual performance score, wherein a result of the evaluation causes performance of further actions including:
removing a prompt fragment from the prompt due to an individual performance score being below a threshold level during training of the prompt or real time performance outside training of the prompt.

15. The network computer of claim 10, further comprising:
selecting the one or more prompt fragments for inclusion in the prompt based on one or more of a network heuristic, a real time metric, a user preference, the response provided by the trained LLM or a requirement.

16. The network computer of claim 10, further comprising:
employing one or more of an ingestion engine or an ingestion agent to process incoming event data that is provided by another service, wherein the other service provides for one or more of collection, cleaning, or normalizing of the incoming event data.

17. The network computer of claim 10, further comprising:
employing one or more analysis engines to generate one or more a report, a visualization, or an interactive report for one or more of the evaluated events or all events that are ingested.

18. The network computer of claim 10, further comprising:
employing one or more action agents to direct an external service to provide a risk score for a network address associated with the one or more events.

* * * * *